United States Patent [19]
Nozaki et al.

[11] Patent Number: 5,263,899
[45] Date of Patent: Nov. 23, 1993

[54] CYLINDRICAL TELESCOPIC KELLY-BAR APPARATUS

[75] Inventors: Satoshi Nozaki; Shuichi Ajiro; Hiroshi Kusumi; Akio Kiue; Kenichi Miyata, all of Ibaragi, Japan

[73] Assignee: Hitachi Construction Machinery Co., Ltd., Tokyo, Japan

[21] Appl. No.: 534,476

[22] Filed: Jun. 7, 1990

[51] Int. Cl.$^5$ .................. E21B 17/07; E21B 17/00; F16D 3/06; F16D 3/18
[52] U.S. Cl. ................................ 464/163; 464/169
[58] Field of Search ............ 464/162, 163, 169, 158, 464/159; 175/321; 403/359

[56]  References Cited
U.S. PATENT DOCUMENTS

| | | | |
|---|---|---|---|
| 1,067,330 | 7/1913 | Griffin | 464/163 X |
| 1,331,309 | 2/1920 | Wright | 464/163 |
| 1,798,480 | 3/1931 | McCullough . | |
| 2,007,666 | 7/1935 | Smith . | |
| 2,991,635 | 7/1961 | Warren . | |
| 3,249,377 | 5/1966 | Weasler . | |
| 3,255,612 | 6/1966 | Mayer et al. | 464/162 X |
| 3,367,142 | 2/1968 | Groves et al. | 464/162 |
| 3,388,755 | 6/1968 | Webb . | |
| 3,492,028 | 1/1970 | Seabourn . | |
| 3,866,746 | 2/1975 | Curington . | |
| 4,241,800 | 12/1980 | Stenuick | 175/400 |
| 4,552,230 | 11/1985 | Anderson et al. | 175/321 |
| 4,568,312 | 2/1986 | Geisthoff | 464/162 |
| 4,781,359 | 11/1988 | Matus | 464/169 X |

FOREIGN PATENT DOCUMENTS

| | | |
|---|---|---|
| 20665 | 9/1882 | Fed. Rep. of Germany . |
| 918366 | 9/1954 | Fed. Rep. of Germany . |
| 1172488 | 6/1964 | Fed. Rep. of Germany . |
| 1220358 | 7/1966 | Fed. Rep. of Germany . |
| 2529849 | 1/1977 | Fed. Rep. of Germany ...... 464/163 |
| 3721949 | 1/1988 | Fed. Rep. of Germany . |
| 8714200 | 3/1988 | Fed. Rep. of Germany . |
| 8714201 | 3/1988 | Fed. Rep. of Germany . |
| 8815738 | 2/1989 | Fed. Rep. of Germany . |
| 8816167 | 2/1989 | Fed. Rep. of Germany . |
| 8902528 | 4/1989 | Fed. Rep. of Germany . |
| 8904493 | 5/1989 | Fed. Rep. of Germany . |
| 1444336 | 5/1966 | France . |
| 2424408 | 11/1979 | France . |
| 1115193 | 5/1968 | United Kingdom . |
| 1128750 | 10/1968 | United Kingdom . |

Primary Examiner—Daniel P. Stodola
Assistant Examiner—William G. Batista, Jr.
Attorney, Agent, or Firm—Oliff & Berridge

[57] ABSTRACT

A kelly-bar apparatus includes, for example, an inner kelly-bar, a second kelly-bar and an outer kelly-bar. These kelly-bars are relatively telescopically operable and torque is transmitted from outside to inside. When the second and outer kelly-bar are in a contracted position, they are supported by a spring on a spring support fixed to the inner kelly-bar. The bottom end of a torque transmitting projection of the inner kelly-bar is fitted into and welded to the spring support. The spring support is fixed onto an engagement member formed integrally with the inner kelly-bar. In addition, a stop member for preventing the second kelly-bar from coming away from the outer kelly-bar projects from the inner periphery of the outer kelly-bar at a location above the torque transmitting portion.

16 Claims, 25 Drawing Sheets

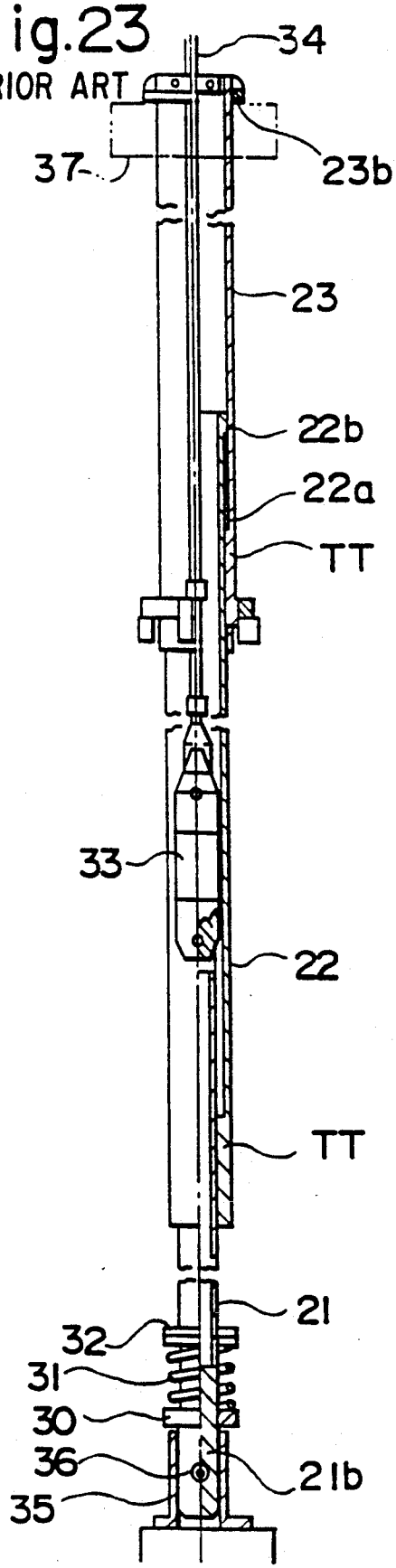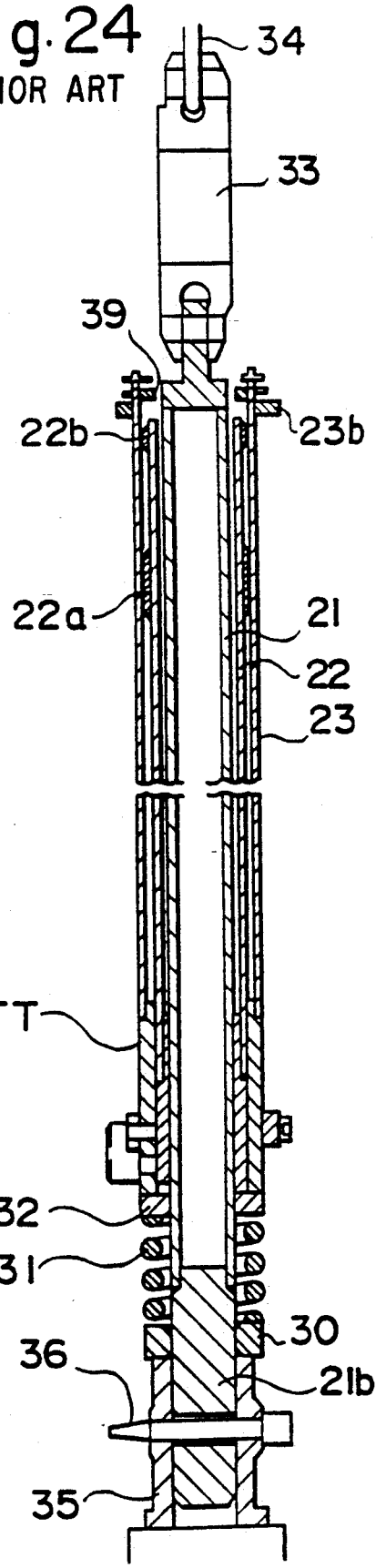

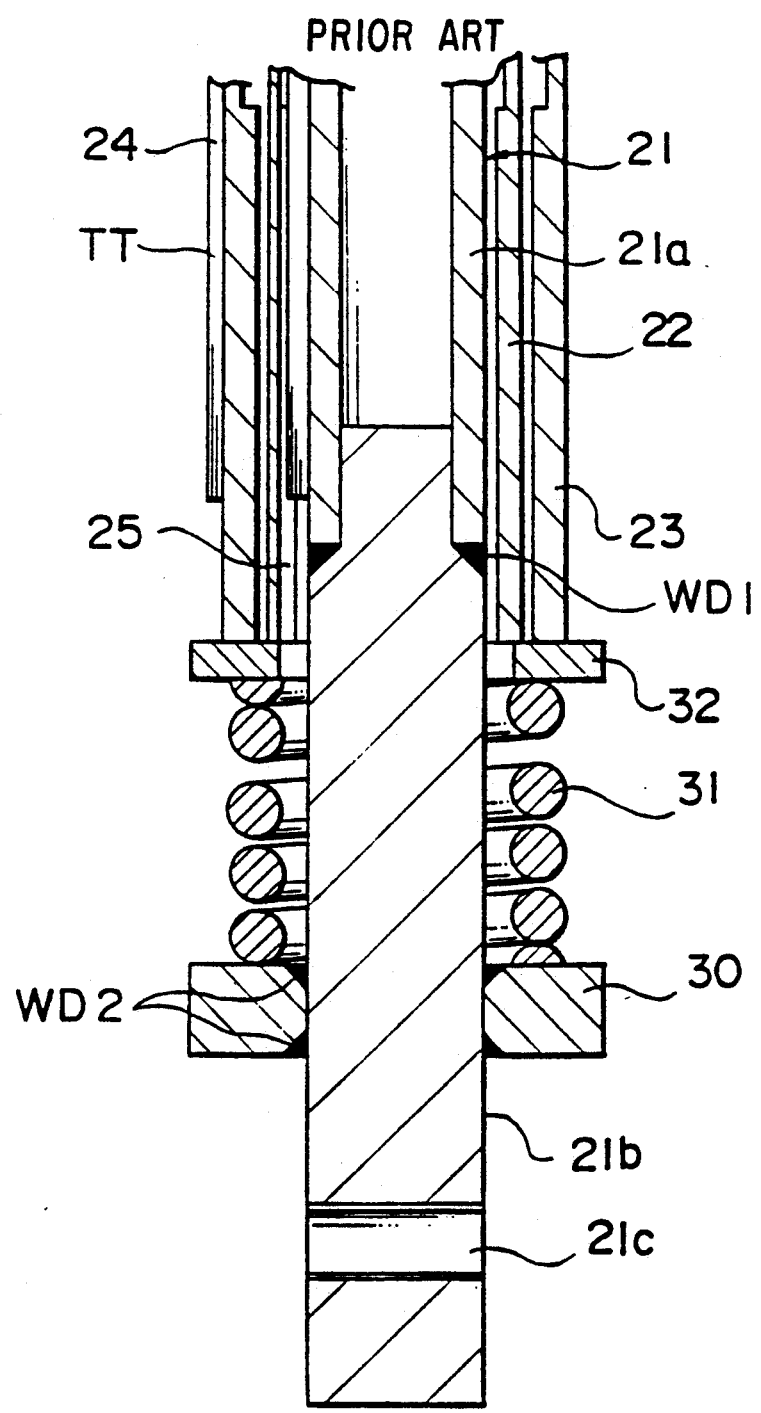

CYLINDRICAL TELESCOPIC KELLY-BAR APPARATUS

BACKGROUND OF THE INVENTION

1. Field of the Invention

The present invention relates to a cylindrical telescopic kelly-bar apparatus for use with a large-diameter excavator such as an earth drill.

2. Description of the Related Art

Vertical excavation employing a large-diameter excavator, such as an earth drill, is performed as follows. Kelly-bars which are assembled in multiple stages are sequentially extended to make excavation while turning the excavating bucket connected to the free end of the excavator. When the excavating bucket is charged with earth and sand, the kelly-bars are sequentially contracted to lift the bucket above the ground, thereby discharging the earth and sand. A vertical hole is excavated by repeating the above-described process.

A known type of cylindrical three-stage kelly-bar apparatus will be explained below with reference to FIGS. 23-27. FIG. 23 shows the kelly bar apparatus extended to its full length in a right side cross section, while FIG. 24 shows the apparatus contracted to its minimum length in a partially omitted, magnified form. FIG. 25 shows the details of the bottom end portion of the kelly-bar apparatus, and FIG. 26 shows the details of the retaining mechanism used in the kelly bar apparatus. FIG. 27 shows the external appearance of an inner kelly bar.

In the illustrated cylindrical telescopic kelly-bar apparatus, an inner kelly-bar 21 is inserted into a second kelly-bar 22 which is in turn inserted into an outer kelly-bar 23. These kelly-bars are arranged to telescopically extend and contract and to transmit to the inner kelly-bar 21 rotational torque imparted to the outer kelly-bar 23 by a kelly driving device 37. More specifically, each of the inner, second and outer kelly-bars 21, 22 and 23 is provided with three torque transmitting bars 24. These three bars 24 extend throughout the corresponding kelly-bar and are spaced apart from one another around the outer periphery of the same. Rectangular grooves 25 for engagement with the respective bars 24 are formed in the bottom end portion of each of the second and outer kelly-bars 22 and 23. The portion of each of the cylindrical kelly-bars 22 and 23 which is provided with the rectangular grooves 25 for engagement with the respective bars 24 is called a torque transmitting portion TT. The bars 24 of the outer kelly-bar 23 are engaged with the kelly driving device 37 actuated by a hydraulic motor (not shown), whereby rotational torque is applied by the kelly driving apparatus 37.

As shown in FIGS. 26 and 27, the inner kelly-bar 21 has a cylindrical upper shaft 21a and a lower shaft 21b having a square shape in cross section, the lower shaft 21b being fitted into and welded to the bottom end of the upper shaft 21a. A brim-like spring support 30 is welded to the lower shaft 21b. A damping spring 31 is held on the spring support 30, and a ring-shaped spring support 32 is held on the top of the damping spring 31. Reference numeral 21c denotes a mounting bore 21c for connection to an excavating bucket (not shown).

The top end of the upper shaft 21a is connected to a suspending rope 34 by means of a swivel joint 33. Although not shown, the suspending rope 34 is suspended from one end of the boom of the large-diameter excavator, and the other end of the rope 34 is wound around the winch of the large-diameter excavator.

On the other hand, the lower shaft 21b of the inner kelly-bar 21 positioned at the bottom end thereof is inserted into the connecting rectangular opening of the excavating bucket 35. The lower shaft 21b and the excavating bucket 35 are connected to each other by a pin 36. As shown in FIG. 26, a strip-shaped retaining member 22a and a strip 22b for preventing radial oscillation are fixed to the top end of the second kelly-bar 22.

The operation of the kelly-bar apparatus having the above-described arrangement and construction will be explained below. In an initial stage of excavation, the inner kelly-bar 21, the second kelly-bar 22 and the outer kelly-bar 23 are in a contracted state and the bottom end faces of the respective kelly-bars are maintained in contact with the kelly-bar receiving plate 32 as shown in FIGS. 24 and 25. When the outer kelly-bar 23 is rotated about its axis by the kelly driving apparatus 37, the rotational torque of the outer kelly-bar 23 is transmitted to the second kelly-bar 22 and the inner kelly-bar 21 in sequence by the engagements between the bars 24 and the respective rectangular grooves 25. The inner kelly-bar 21 is in turn rotated about its axis to cause the excavating bucket 35 to make excavation. The above-described process proceeds as the suspending rope 34 is gradually moved down. Initially, the inner kelly-bar 21, the second kelly-bar 22 and the outer kelly-bar 23 are integrally moved down until a top retaining member 23b of the outer kelly-bar 23 falls on the kelly driving device 37. When excavation further proceeds, the inner and second kelly-bars 21 and 22 integrally extend from the outer kelly-bar 23. As shown in FIGS. 23 and 26, the ring-shaped retaining member 22a of the second kelly-bar 22 falls on the top end face of the torque transmitting portion TT of the outer kelly-bar 23, and only the inner kelly-bar 21 moves down to continue excavation.

The above described conventional kelly-bar apparatus has a number of problems as follows.

1) The second kelly-bar 22 and the outer kelly-bar 23 each has a cylindrical configuration. The inner kelly-bar 21 includes the cylindrical upper shaft 21a and the prism-shaped lower shaft 21b for the purpose of connecting the excavating bucket 35 with the bottom end of the inner kelly-bar 21. Accordingly, the cross-sectional configuration of the inner kelly-bar 21 abruptly changes from circle to rectangle at the portion where the upper shaft 21a is connected to the lower shaft 21b, and stress concentration easily occurs in such a cross-sectionally irregular portion. In the case of the conventional arrangement in which the cylindrical upper shaft 21a and the prism-shaped lower shaft 21b are, as described above, connected to each other by simple circumferential welding as shown by symbol WD1 in FIG. 25, the fatigue strength is low and the life of the kelly-bar apparatus is limited.

To overcome the above-described disadvantages, the following process may be considered. The lower shaft 21b is formed from a rectangular material by cutting, and the lower portion of the lower shaft 21b beneath the spring support 30 is formed as a prism-like portion for connection with a bucket. The upper portion of the same above the spring support 30 is formed as a cylindrical portion having the same diameter as the upper shaft 21a, and the top end of this cylindrical portion is welded to the upper shaft 21a. The use of this structure allows the welded portion and the cross-sectionally irregular portion to be offset from each other, thereby making it possible to relax stress concentration. However, this structure has the following problem. The aforesaid bars 24 extend throughout the length of the outer periphery of the cylindrical portion above the spring support 30, and the spring support 30 is fitted onto and welded to the bottom end of the cylindrical portion. If the bottom ends of the bars 24 are abutted on and welded to the top face of the spring support 30, stress concentration in the fillet welded portion of the spring support 30 is combined with stress concentration in the welded portion of the bottom end of the bars 24. If welding is performed with no bottom end of the bars 24 maintained in contact with the spring support 30, the fatigue strength is reduced.

In addition, in the conventional arrangement, although the spring support 30 is fitted onto the cylindrical portion or the lower shaft 21b of the prism-shaped portion by fillet welding as indicated by symbol WD2 in FIG. 25, impact occurring when the second or outer kelly-bar 22 or 23 has fallen is transmitted to the spring support 30 through the damping spring 31 and shearing forces directly act on the welded portion. This may lead to a reduction in the lifetime of a kelly-bar apparatus.

2) It is desirable that the second kelly-bar 22 be arranged in order to improve the strength thereof.

2-a) Since the bars 24 slide along the inner walls of the respective rectangular grooves 25 of the torque transmitting portion TT during the rotation of the kelly-bar apparatus, portions including the respective rectangular grooves 25 are exposed to wear when the apparatus is in use. If the wear excessively proceeds, a crack may be formed in the bottom end portion of the torque transmitting portion TT. If the crack proceeds upwardly and reaches the top of the torque transmitting portion TT, the open end 23a of the outer kelly-bar 23 is opened in flared form as shown by two-dot-dashed lines in FIG. 26. As a result, the ring-shaped retaining member 22a may not be able to engage with the top of the torque transmitting portion TT. For these reasons, when the above-described kelly-bar apparatus is in use an operator is forced to consistently inspect the state of wear on the rectangular grooves 25.

2-B) If torque is applied to one end of the kelly-bar which is fixed at the other end, a shearing strain occurs over the entire length of the kelly-bar. Accordingly, the central axes of the respective recesses 25 on the driven side of the kelly-bar are inclined with respect to the central axis of the fixed side of the kelly-bar, and the grooves 25 of the driven (outer) side of the kelly-bar and the bars 24 of the fixed (inner) side of the kelly-bar are inclined in the axial direction. As a result, the grooves 25 and the corresponding bars 24 come into local contact with each other near the edges of the respective grooves which are positioned at the top and bottom of the torque transmitting portion TT, thus leading to high surface pressure or high stress.

Since the kelly-bar is made from a material such as an elongated pipe or a round bar for its functional reason, it is easily bent in the direction perpendicular to the axis. The material itself also includes bending or strain. In addition, since a plurality of kelly-bars having different bendings or strains are combined by insertion, the inclination of the lengthwise central axis of the inner kelly-bar does not coincide with that of the lengthwise central axis of the outer kelly-bar, i.e., both central axis are relatively inclined. If sharp edges are formed at the ends of the respective recesses of the torque transmitting portion of the kelly-bar, the tips of the edges come into contact with the inner kelly-bar and high surface pressure and high stress locally occur. Also, in the inclination between the axes of the inner and outer kelly-bars, the bars 24 come into contact with the respective grooves 25 near the open end (bottom end) of the outer kelly-bar. Accordingly, the above-described structure is disadvantage in terms of strength. For this reason, it is necessary to excessively increase the outer diameter or wall thickness of the torque transmitting portion TT. Furthermore, if sharp edges are formed at the ends of the grooves of the torque transmitting portion TT, a specific kelly-bar is scratched by the sharp edges and smooth telescopic operation can not be achieved.

SUMMARY OF THE INVENTION

It is therefore an object of the present invention to provide a cylindrical telescopic kelly-bar apparatus including a first kelly-bar and a second kelly-bar which are improved in fatigue strength, an excavating bucket being connected to the bottom end of the first kelly-bar, the second kelly-bar for housing kelly-bars such as the first kelly-bar being arranged to transmit torque to the inner kelly-bars.

A flange-like spring support for receiving a spring which supports a second kelly-bar, e.g., a second kelly-bar 60 in FIG. 1, is welded to a first kelly-bar, e.g., an inner kelly-bar 50 in FIG. 1, having the bottom end to which the excavating bucket is connected. Torque transmitting projections axially extend along a portion above the spring support, and the bottom ends of the respective projections are fitted into and welded to the spring support. Accordingly, since stress concentration in the welded portion of the spring support is not combined with stress concentration in the bottom ends of the projections, improved strength can be provided.

A flange-like engagement member for the spring support is provided at the bottom end of the first kelly-bar. The spring support is placed on the engagement member and welded to the first kelly-bar. Accordingly, impact occurring when the second kelly-bar falls on the spring is retained by the engagement member, whereby the strength of mounting of the spring support is improved.

A stop member for preventing a first kelly-bar, e.g., the second kelly-bar 60 in FIG. 2, from coming off is formed to project from the inner periphery of a second kelly-bar, e.g., an outer kelly-bar 70 in FIG. 2, at a location above a torque transmitting portion. A retaining member for the second kelly-bar is brought into engagement with the stop member to prevent the first kelly-bar from coming off. Even if there occurs a crack which extends from the bottom end of the torque transmitting portion in the axially upward direction, the crack does not proceed beyond the torque transmitting portion. Accordingly, the first kelly-bar is reliably maintained in engagement with the stop member.

In case of a structure in which an outside kelly-bar is prevented from coming off by engaging the retaining member of an inside kelly-bar with the torque transmitting portion of the outside kelly-bar, a crack-expansion preventing recess is formed so as to transverse the middle of the axial length of the torque transmitting recesses of the torque transmitting portion of the outside kelly-bar. This recess prevents a crack from proceeding upwardly from the bottom end of the outside kelly-bar, whereby the inside kelly-bar is similarly reliably prevented from coming off.

The torque transmitting projections of the first kelly-bar (or inside kelly-bar, such as an inner kelly-bar 50 or the second kelly-bar 60 in FIG. 9, which receives torque from an outer kelly-bar) engage with the corresponding torque transmitting recesses of the second kelly-bar (or outside kelly-bar, such as the second kelly-bar 60 or the outer kelly-bar 70 in FIG. 1, which transmits torque to the inside kelly-bar). The edge portion of one end (open end) of the inner periphery of each torque transmitting recess is provided with a rounded portion or a chamfered portion so as not to bring the projections into point or line contact with the respective edge portions, that is, so as to bring the projection into surface contact therewith. A rounded or chambered portion, as by crowning, is formed at at least one side of each of the opposing faces of the torque transmitting recesses so that the projections come into similar contact. Accordingly, stress due to the contact of the projections with the recesses is reduced.

The first kelly-bar (or inner kelly-bar) includes a cylindrical or round-bar-shaped upper shaft which is provided with upper torque transmitting projections around its outer periphery, and a lower shaft welded to the bottom of the upper shaft, an excavating bucket being connected to the bottom end of the lower shaft. The lower shaft is formed from a single member, and lower torque transmitting projections, which are connected to the respective upper torque transmitting projections, are formed integrally with the upper portion of the outer periphery of the lower shaft by cutting. The upper torque transmitting projections extend downwardly from the bottom end of the upper shaft along the outer periphery of the lower shaft. The projecting ends of the respective upper torque transmitting projections are welded to the lower shaft and the lower torque transmitting projections.

The first kelly-bar (or inner kelly-bar) is made from a single round-bar-like or cylindrical member, and its bottom end is provided with a connecting projection for connection with the connecting rectangular opening of an excavating bucket.

Each drainage recess formed in the torque transmitting portion has a curved base.

The above and other objects, features and advantages of the present invention will be apparent from the following description of preferred embodiments of the invention with reference to the accompanying drawings.

BRIEF DESCRIPTION OF THE DRAWINGS

FIG. 23 is a semi-sectional view showing a conventional kelly-bar apparatus which is fully extended;

FIG. 24 is an enlarged cross-sectional view showing the kelly-bar apparatus of FIG. 23 which is fully contracted;

FIG. 25 is a further enlarged view showing the bottom end of the kelly-bar apparatus of FIG. 24;

DESCRIPTION OF THE PREFERRED EMBODIMENTS

Preferred embodiments of the present invention will be explained with reference to FIGS. 1 to 22.

Figure 1:
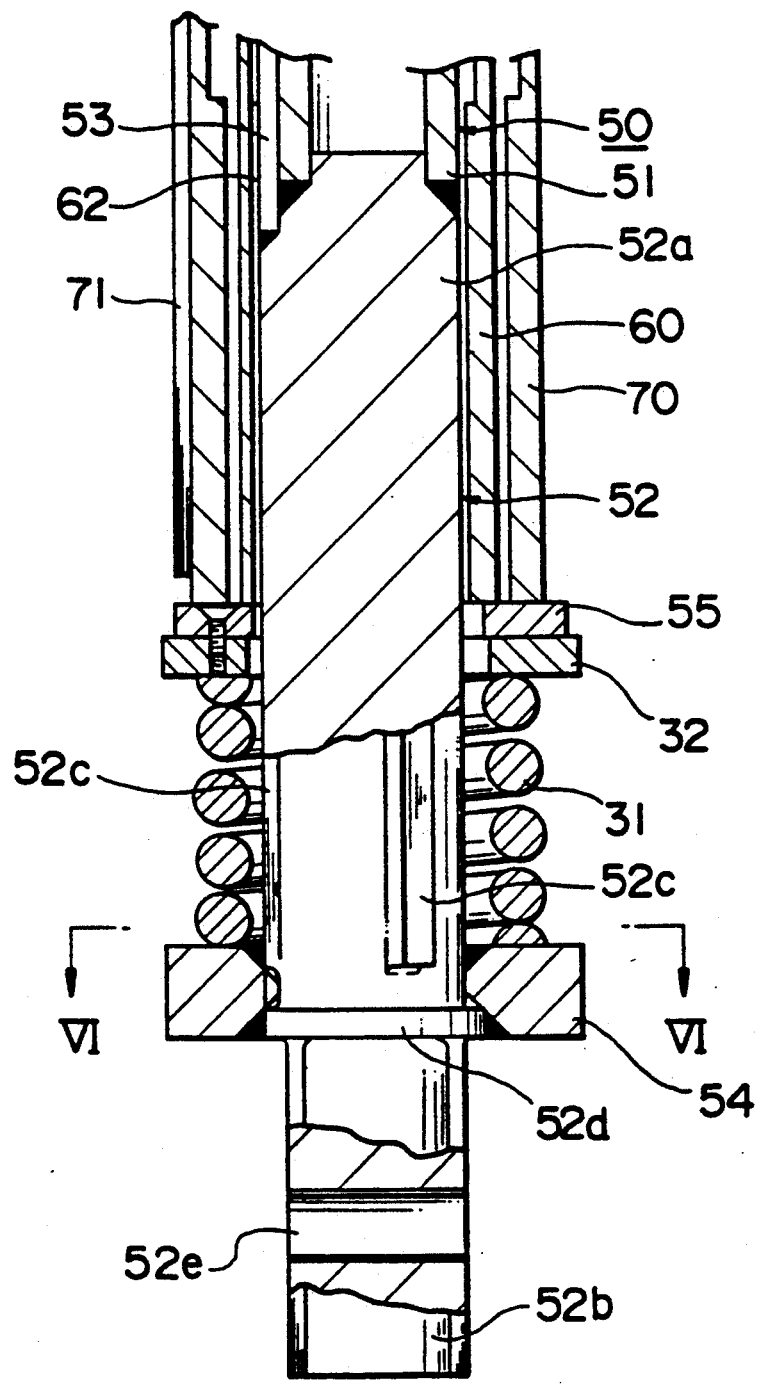
FIG. 1 is a partially cross-sectional view, taken along line I—I of FIG. 3, of a kelly-bar apparatus according to the present invention, and shows on an enlarged scale the bottom portion of the kelly bar apparatus in a contracted state.
Figure 2:
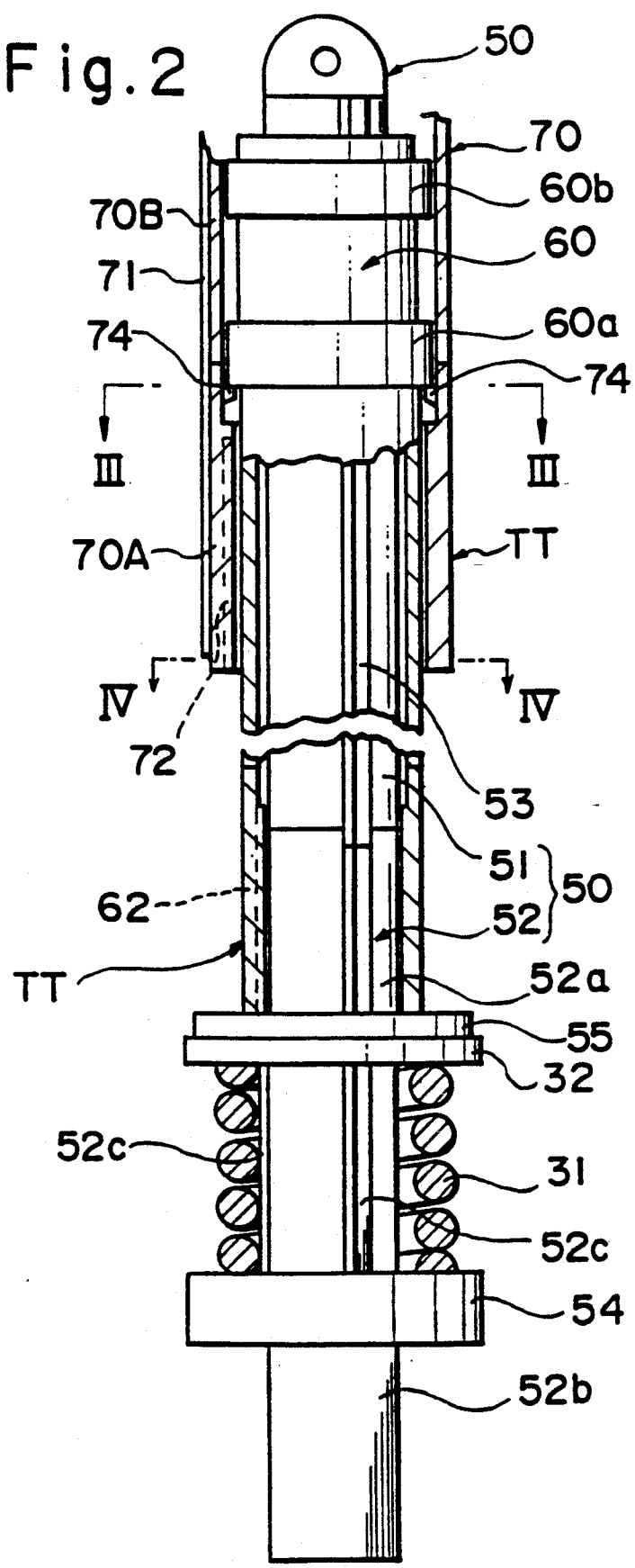
FIG. 2 is a partial cross-sectional view, taken along line I—I of FIG. 3, of the kelly-bar apparatus according to the present invention, and shows the state of a second kelly-bar completely extending from an outer kelly-bar.
Figure 3:
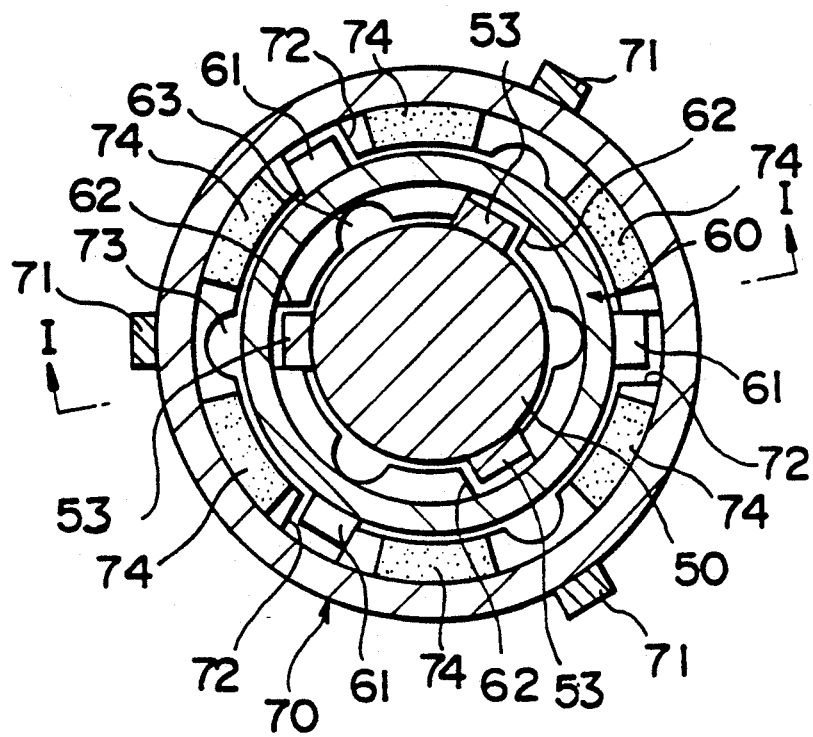
FIG. 3 is an enlarged cross-sectional view taken along line III—III of FIG. 2.
Figure 4:
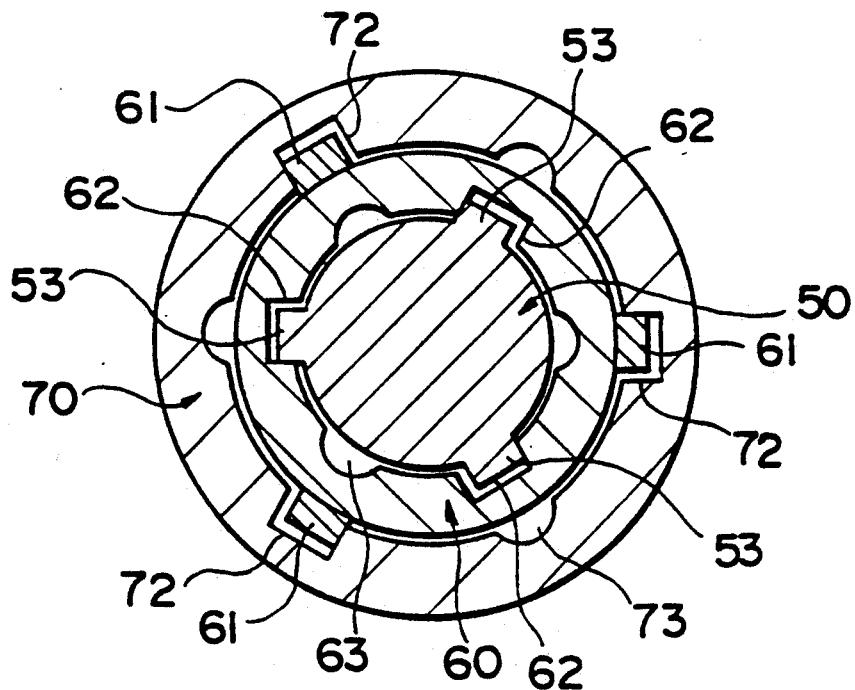
FIG. 4 is an enlarged cross-sectional view taken along line IV—IV of FIG. 2.

FIGS. 1 and 2 are partially cross-sectional views taken along line I—I of FIG. 3, and show a first embodiment of a kelly-bar apparatus according to the present invention. FIG. 3 is a cross-sectional view taken along line III—III of FIGS. 1 and 2, and FIG. 4 is a cross-sectional view taken along line VI—VI.

The arrangement and construction of the illustrated kelly-bar apparatus are similar to those of the abovedescribed conventional apparatus. As shown, an inner kelly-bar 50 is inserted into a second kelly-bar 60, which is in turn inserted into an outer kelly-bar 70. These kelly-bars 50, 60 and 70 are arranged for telescopic motion. The outer kelly-bar 70 has a torque transmitting bar 71 connected to a kelly driving device (not shown), and an excavating bucket (not shown) is connected to the bottom end of the inner kelly-bar 50. Three torque transmitting bars 53 (52c) are formed on the inner kelly-bar 50 in such a manner that they are spaced apart from one another around the outer periphery of the inner kelly-bar 50 and axially extend substantially over the entire length of the same. Similarly, three torque transmitting bars 61 are formed on the second kelly-bar 60. Each of the torque transmitting bars 53 (52c) and 61 has a rectangular cross section projecting from the outer periphery of the corresponding kelly-bar. The bottom end portions of the second kelly-bar 60 and the outer kelly-bar 70 serves as a torque transmitting portion TT. Torque transmitting rectangular grooves 62 and 72 are respectively formed in the second kelly-bar 60 and the outer kelly-bar 70 at a location corresponding to the torque transmitting portion TT. The torque transmitting rectangular grooves 62 and 72 can come into engagement with the torque transmitting bars 53 (52c) and 61, respectively. A retaining member 60a for preventing the second kelly-bar 60 from coming off is integrally formed in the top end portion thereof.

Figure 5:
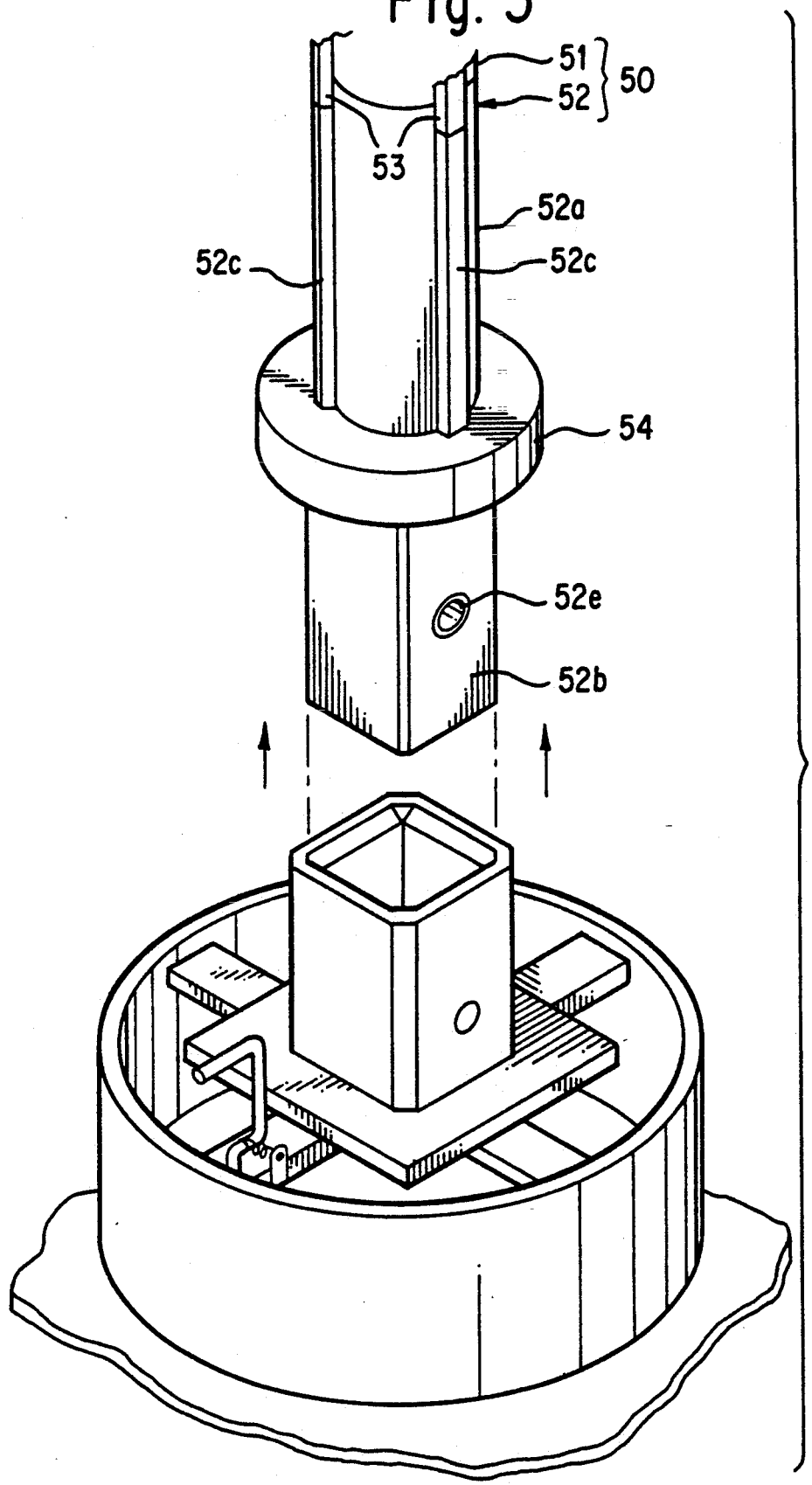
FIG. 5 is a perspective view showing the inner kelly-bar of the kelly-bar apparatus of FIG. 1.
Figure 6:
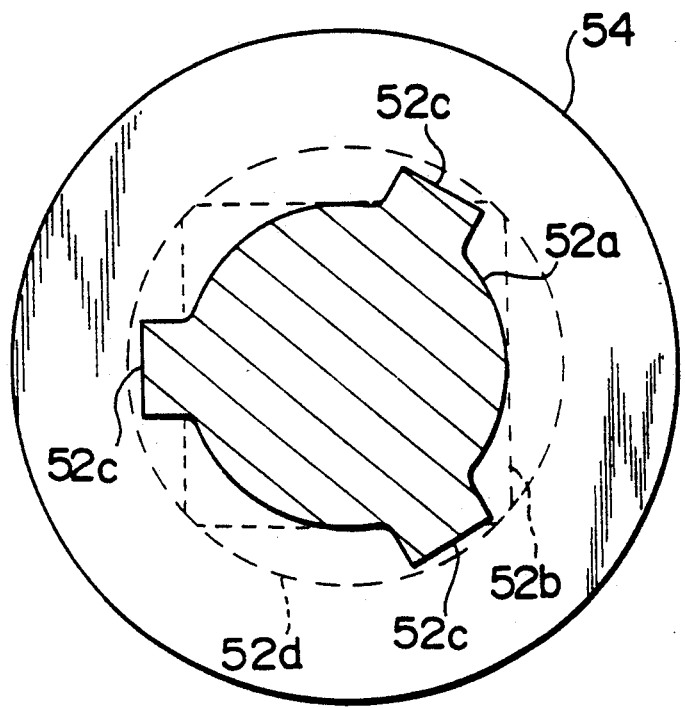
FIG. 6 is an enlarged cross-sectional view taken along line VI—VI of FIG. 1.

As shown in FIGS. 1 and 5, the inner kelly-bar 50 includes an upper shaft 51 having a cylindrical shape, and a lower shaft 52 welded to the bottom end of the upper shaft 51. The lower shaft 52 includes a cylindrical portion 52a and a prism-shaped portion 52b. The cylindrical portion 52a has the same diameter as the upper shaft 51, and torque transmitting bars 52c are formed to project from the outer periphery of the cylindrical body 52a (refer to FIG. 6). The prism-shaped portion 52b extends from the bottom end of the cylindrical portion 52a, and has an engagement flange 52d at its top end and a through-hole 52e for mounting a bucket connecting pin. The cylindrical portion 52a and the prism-shaped portion 52b are formed from a single round bar material. A spring support 54 is fixed to the bottom end of the cylindrical portion 52a by a double-bevel groove welding process. As can be seen from FIG. 7, the spring support 54 has a substantially annular shape. An upper portion 54a of a central through-hole is formed into a cross-sectional shape corresponding to that of the cylindrical portion 52a, and has a circumferential wall 54a1 and recesses 54a2. A lower portion 54b of the central through-hole is formed into a shape corresponding to that of the engagement flange 52d. The bottom ends of the respective torque transmitting bars 52c are fitted into and welded to the spring support 54.

As shown also in FIG. 5, the torque transmitting bars 53 are welded to the outer periphery of the upper shaft 51 at three spaced locations and in phase with the aforesaid bars 52c. The bottom end of each of the bars 53 extends from the bottom end of the upper shaft 51 in the downward direction along the outer periphery of the lower shaft 52. The bottom ends of the respective bars 53 are welded to the top ends of the corresponding bars 52c and the upper peripheral surface of the cylindrical portion 52a. These bars 53 and 52b are brought into engagement with the respective torque transmitting rectangular grooves 62 formed in the second kelly-bar 60.

A damping member 55 is disposed immediately above the spring support 32 for suppressing noise which is produced when the bottom ends of the second and outer kelly-bars 60 and 70 fall on the spring support 32.

In the above-described arrangement and construction of the inner kelly-bar 50, the bottom end of the cylindrical portion 52a to which the three bars 52c extend is fitted onto and welded to the spring support 54 by a double-bevel-groove welding process. Accordingly, stresses which are concentrated in the bottom ends of the cylindrical portion 52a to which the respective bars 52c are extended are not combined with stresses which are concentrated in the portion of the cylindrical portion 52a to which the spring support 54 is welded by a double-bevel-groove welding process. As a result, stress concentration of the cylindrical portion 52a is relaxed, so that the inner kelly-bar 50 is improved in fatigue strength.

The spring support 54 is welded in engagement with the engagement flange 52d integral with the lower shaft 52, whereby impact occurring when the second kelly-bar 60 and the outer kelly-bar 70 fall on the spring support 32 can be retained by the engagement flange 52d. Accordingly, the spring support 54 can be fixed to the lower shaft 52 with improved strength.

The lower shaft 52 including the cylindrical portion 52a and the prism-shaped portion 52b is formed from a round bar by cutting, and the cylindrical portion 52a is fitted into and welded to the upper shaft 51. The lower shaft 52 can therefore be connected to the upper shaft 51 without any abrupt change in cross section. Accordingly, stress concentration in the connection is relaxed and fatigue strength is improved. Also, the bottom ends of the respective bars 53 which are welded to the outer periphery of the upper shaft 51 extend downward from the bottom end of the upper shaft 51, and the extending bottom ends are welded to the top ends of the corresponding bar 52c and the top end portion of the cylindrical portion 52a. Accordingly, it is possible to increase the strength of the welded portions of the upper shaft 51 and the lower shaft 52 and also the strength of the bars 53.

As described previously, as excavation proceeds, the inner kelly-bar 50 and the second kelly-bar 60 integrally extend from the outer kelly-bar 70. When these kelly-bars 50 and 60 extend to their full length, the inner kelly-bar 50 extends from the second kelly-bar 60 to drill a deep hole. However, in many cases, holes are drilled to such a depth that the inner kelly-bar 50 need not be extended from the second kelly-bar 60. When the inner kelly-bar 50 is accommodated in the second kelly-bar 60, the bars 52c of the cylindrical portion 52a are normally placed in engagement with the rectangular grooves 62 of the second kelly-bar 60 for the purpose of torque transmission. Since the bars 52c are integrally projected from the outer periphery of the cylindrical portion 52a by cutting, the following advantage can be enjoyed.

Figures 8A, 8B:
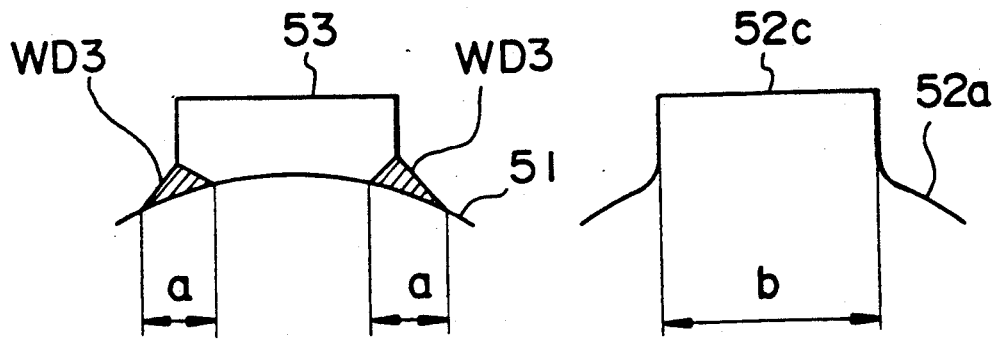
FIGS. 8(a) and 8(b) are views comparatively showing the advantage of lower torque transmitting projections.
Figure 7A:
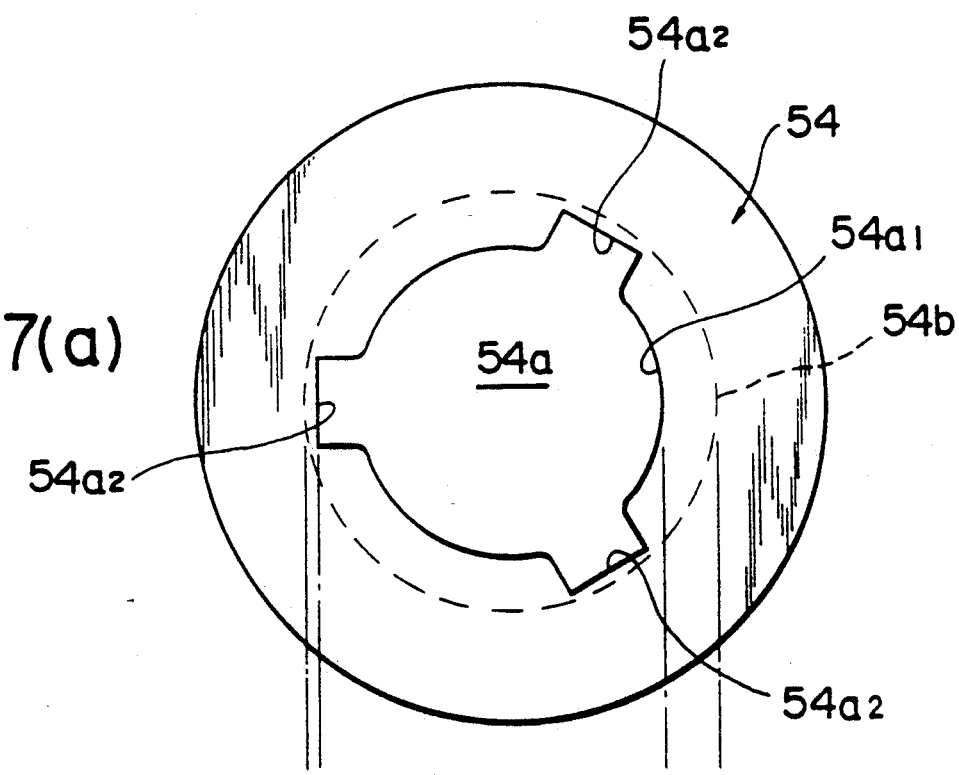
FIG. 7(a) is an enlarged plan view of the spring support of the kelly-bar apparatus of FIG. 1.
Figure 7B:
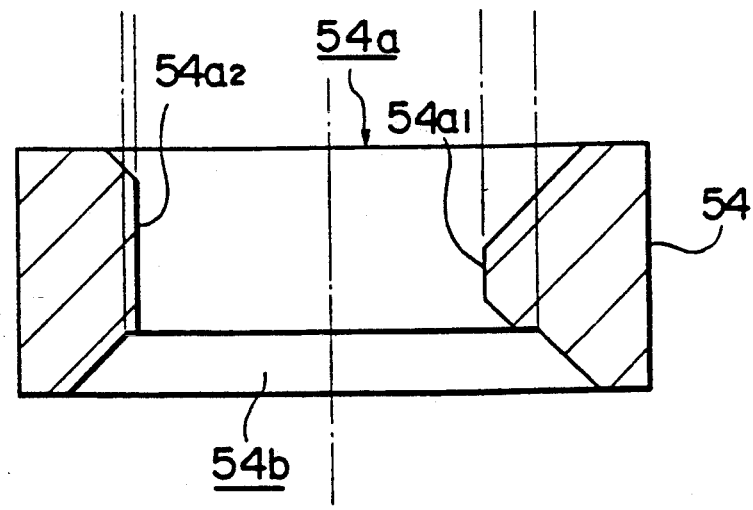
FIG. 7(b) is a vertical sectional view of the spring support.

More specifically, as shown in FIG. 8(a), the bars 53 are welded to the upper shaft 51 solely through welded beads WD3 each having a width a, and large stresses are applied to the welded areas. The welding beads WD3 also tend to suffer stress concentration at their respective terminal ends. To prevent the stress concentration, grinding, which is a time-consuming task, is needed. In addition, the welding beads WD3 may wear during the operation of the apparatus, and the upper shaft 51 may be thermally affected during welding, leading to a lowering in strength.

In contrast, as shown in FIG. 8(b), each of the bars 52c which are formed integrally with the cylindrical portion 52a by cutting, has a wide base of width b. Accordingly, stresses are uniformly reduced and grinding is not required. Further, there is no risk of wear occurring on a welded portion and, since welding is not needed, the cylindrical portion 52a is not thermally affected. As is apparent from the foregoing, the bars 52c which are frequently used are extremely advantageous in terms of strength, whereby the life of the kelly-bar apparatus can be extended.

As shown in FIGS. 2 and 3, the outer kelly-bar 70 includes a thick-walled cylinder 70A having the torque transmitting portion TT, and a thin-walled cylinder 70B connected to the top end of the thick-walled cylinder 70A. Three torque transmitting rectangular grooves 72 are formed over a predetermined length in the inner peripheral portion of the torque transmitting portion TT of the outer kelly-bar 70. The rectangular grooves 72 are spaced apart so as to engage with the respective bars 61 on the second kelly-bar 60. Drainage grooves 63 and 73 are respectively formed over a predetermined length in the inner peripheral portions of the torque transmitting portion TT of the second kelly-bar 60 and the outer kelly-bar 70.

Stop members 74 for preventing the second kelly-bar 60 from coming off are disposed to project from the inner periphery of the thick-walled cylinder 70A at a location slightly above the top end face of the torque transmitting portion TT. As shown by a pattern sprinkled with dots in FIG. 3, the stop members 74 are annularly spaced apart with each positioned between the rectangular groove 72 and the drainage groove 73. As can be seen from FIGS. 3 and 4, since the stop members 74 are positioned at locations offset from the bars 60 of the second kelly-bar 61, the stop members 74 do not hinder the telescopic operation of the second kelly-bar 60.

In the above-described embodiment, the outer kelly-bar 70 includes the thick-walled cylinder 70A and the thin-walled cylinder 70B, and the engagement members 74 are disposed on the inner periphery of the thick-walled cylinder 70A. This arrangement enables the stop members 74 to be easily and reliably welded. The stop members 74 may, of course, be disposed on the thin-walled cylinder 70B, and the number of stop members 74 and the forms thereof are not limited to those illustrated in the above-described embodiment.

When the outer kelly-bar 70 is rotated about its axis by means of the kelly driving device (not shown), the rotary motion of the outer kelly-bar 70 is transmitted to the inner kelly-bar 60 by the engagements between the bars and the corresponding rectangular grooves. The inner kelly-bar 50 is in turn rotated about its axis to turn the excavating bucket 59 connected to the bottom end of the inner kelly-bar 50, thereby initiating excavation. When excavation proceeds and an upper retaining member (not shown) of the outer kelly bar 70 engages with the kelly driving device (not shown), the second kelly-bar 60 and the inner kelly-bar 50 integrally extend from the outer kelly-bar 70 to continue the excavation. When the retaining member 60a of the second kelly-bar 60 falls on the stop members 74, further extension of the second kelly-bar 60 is hindered, and the inner kelly-bar 50 extends from the second kelly-bar 60 to continue the excavation.

If a crack should be formed in the bottom end portion of the thick-walled torque transmitting portion TT of the outer kelly-bar 70 and proceeds upwardly when the kelly-bar apparatus is in use, the crack is arrested at a portion where the wall thickness varies. Accordingly, even if the bottom end of the kelly-bar 70 happens to open in flared form, the retaining member 60a reliably engages with the stop members 74.

As shown in FIGS. 3 and 4, the three drainage grooves 63 and 73 are respectively formed in the inner peripheral portions of the torque transmitting portions TT of the second kelly-bar 60 and the outer kelly-bar 70. The drainage grooves 63 and 73 extend in the axial direction and are positioned out of phase with the respective rectangular grooves 62 and 72. Although not shown, the three hemispherical drainage grooves 63 and 73 of the second and outer kelly-bars 60 and 70 respectively communicate with drainage bores which extend radially from inside to outside.

Since the drainage grooves 63 and 73 have hemispherical configurations in cross section, the portions of the respective kelly-bars 60 and 70 which define the corners of each groove can be made thick compared to any arrangement using rectangular grooves. Accordingly, the strength of each kelly-bar is improved, and transmission of increased torque is enabled.

Since the hemispherical drainage grooves 63 and 73 have no rectangular corners, it is possible to suppress adhesion of mud or dust during drainage of a liquid such as a bentonite liquid containing mud. Accordingly, smooth drainage is enabled and drainage time does not excessively increase.

Figure 9:
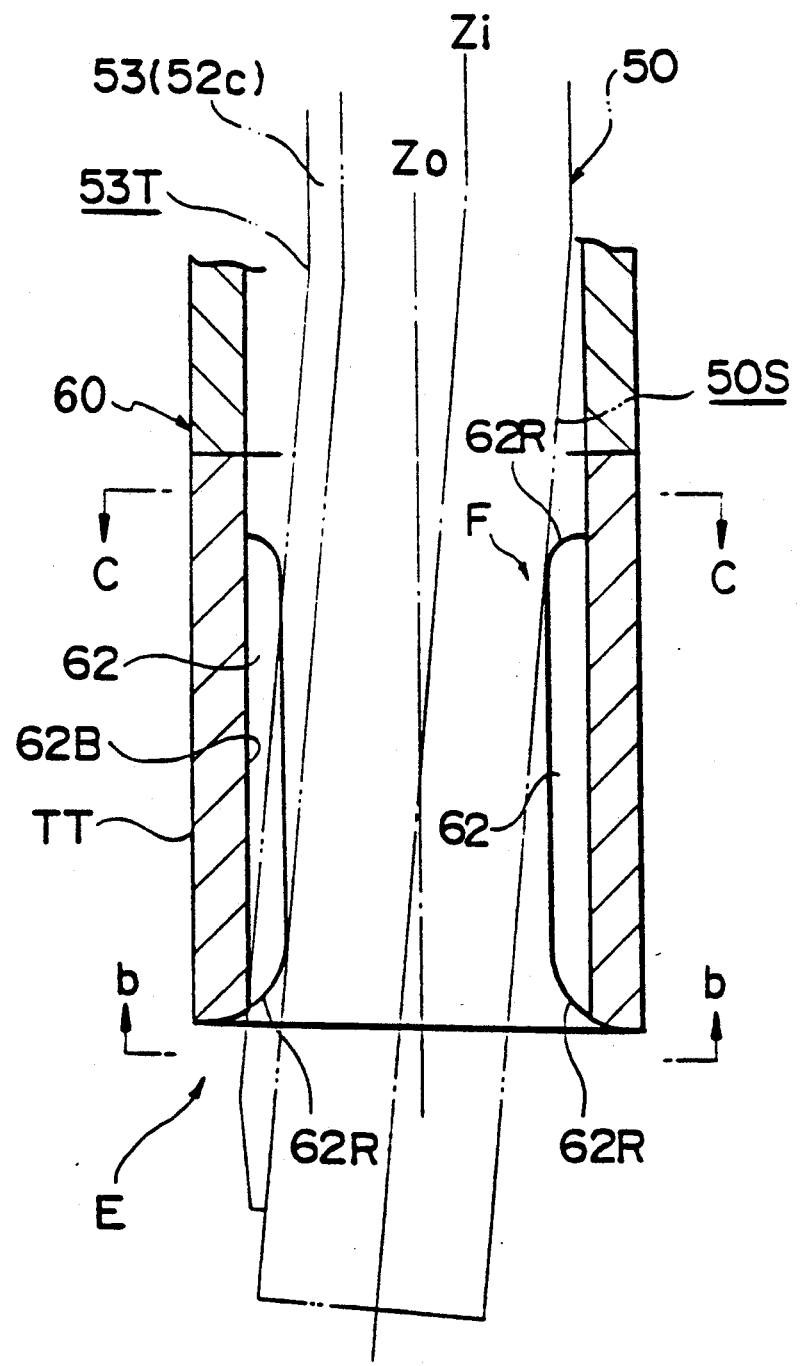
FIG. 9(a) is a vertical sectional view of a second kelly-bar, and shows rounded portions of the edges thereof for relaxinq contact pressures acting on bars and corresponding rectangular grooves in the torque transmitting portion.
FIG. 9(b) is a sectional view taken along line b—b of FIG. 9(a)
FIG. 9(c) is a sectional view taken along line c—c of FIG. 9(a)
Figure 9B:
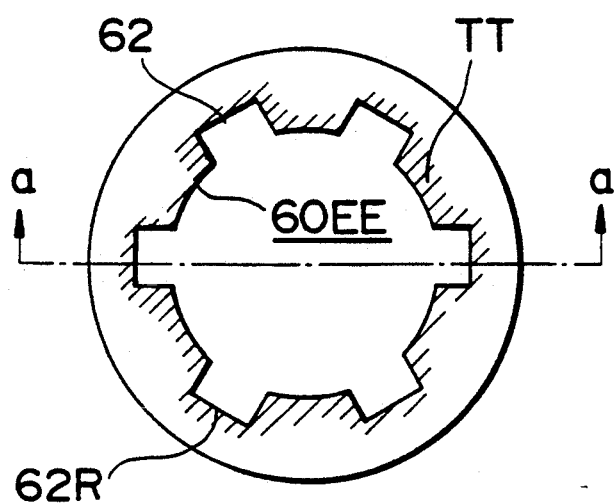
Figure 9C:
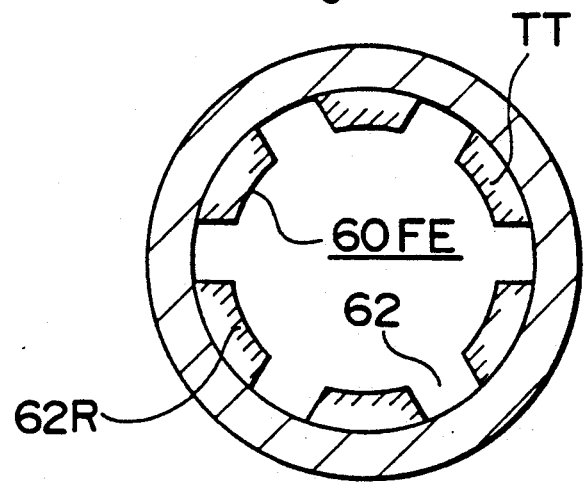

In addition, in the above-described embodiment of a kelly-bar apparatus, the torque transmitting rectangular grooves 62 and 72 of the respective second and outer kelly-bars 60 and 70 are formed as shown in FIGS. 9(a), 9(b) and 9(c), whereby the fatigue strength of the kelly-bars 60 and 70 is improved.

If the axis of the inner kelly-bar 50 is inclined or curved as indicated by symbol Zi in FIG. 9(a), the inner kelly-bar 50 will come into local contact with the open end E of the second kelly-bar 60 and the top end F of each groove 62. For this reason, both ends E and F are rounded to form rounded portions 62R. The rounded portions 62R are formed over inner peripheral areas 60EE and 60FE, which are shown by hatching in FIGS. 9(b) and 9(c), respectively.

The provision of the rounded portions 62R in the respective inner peripheral areas 60EE and 60FE increases an area in which the top face 53T of each bar 53 of the inner kelly-bar 50 contacts the bottom face of the corresponding groove 62 at or near the bottom end E of the torque transmitting portion TT of the second kelly-bar 60. Accordingly, the occurrence of local contact is prevented, and excessive surface pressure and large stress is suppressed.

At or near the top end F, a contact area increases in which the peripheral surface 50S of the inner kelly-bar 50 is in contact with the inner peripheral area 60FE of the torque transmitting portion TT in which the grooves 62 are formed. Accordingly, at or near the top end F as well, surface pressure and stresses are relaxed. In addition, since the contact position of the bars 53 and the grooves 62 is positioned axially inwardly from the open end of the second kelly-bar 60, the arrangement of the embodiment is advantageous in terms of strength.

Furthermore, it is possible to prevent the inner kelly-bar 50 from scratching the second kelly-bar 60 when the inner kelly-bar 50 is being slid inward or outward, that is, during the telescopic motion of the kelly-bar apparatus. Accordingly, the telescopic motion can be smoothly performed.

Figure 10:
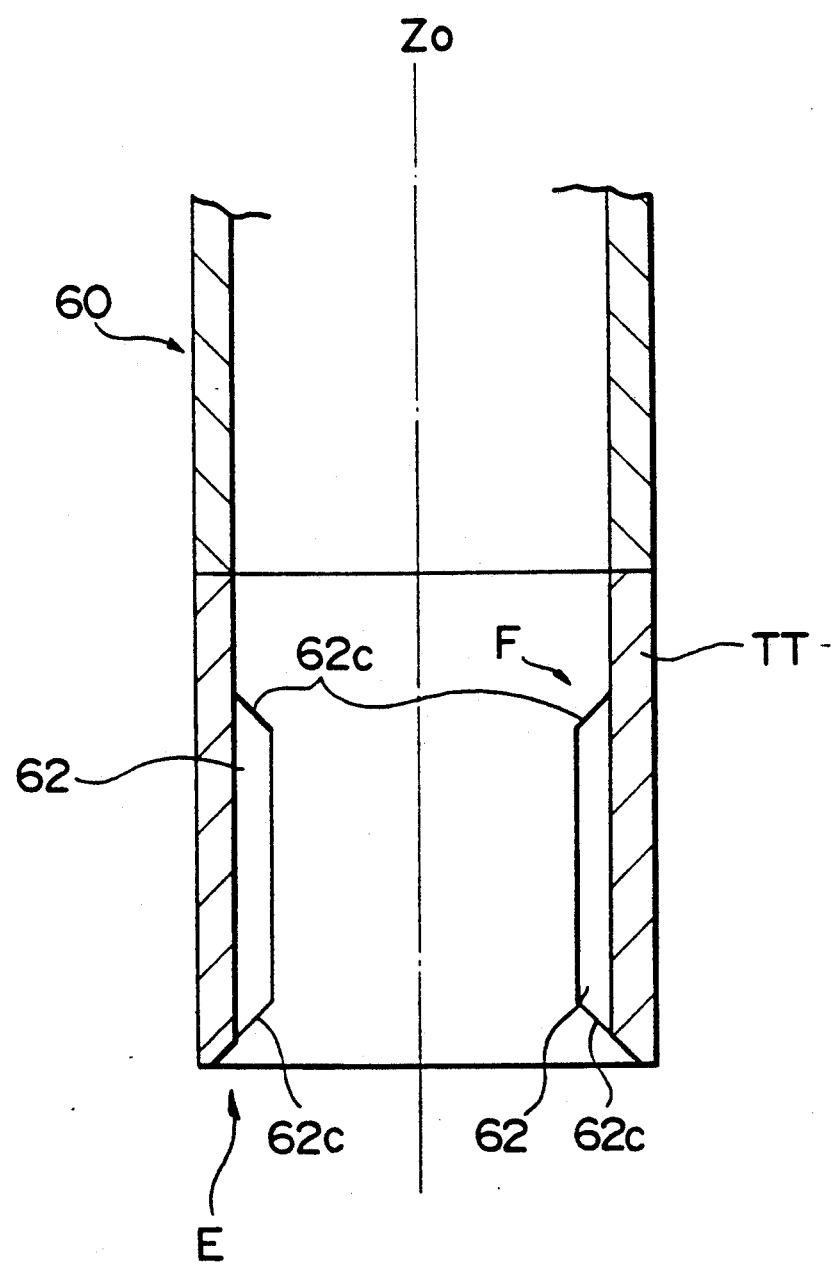
FIGS. 10 and 11 are schematic sectional views of a second kelly-bar, and shows a modification in which chamfered portions are substituted for rounded portions.

As shown in FIG. 10, chambered portions 62C may be formed not by rounding but by chamfering. The advantages and effects of this arrangement are substantially identical to those of the arrangement shown in FIG. 9.

Figure 11:
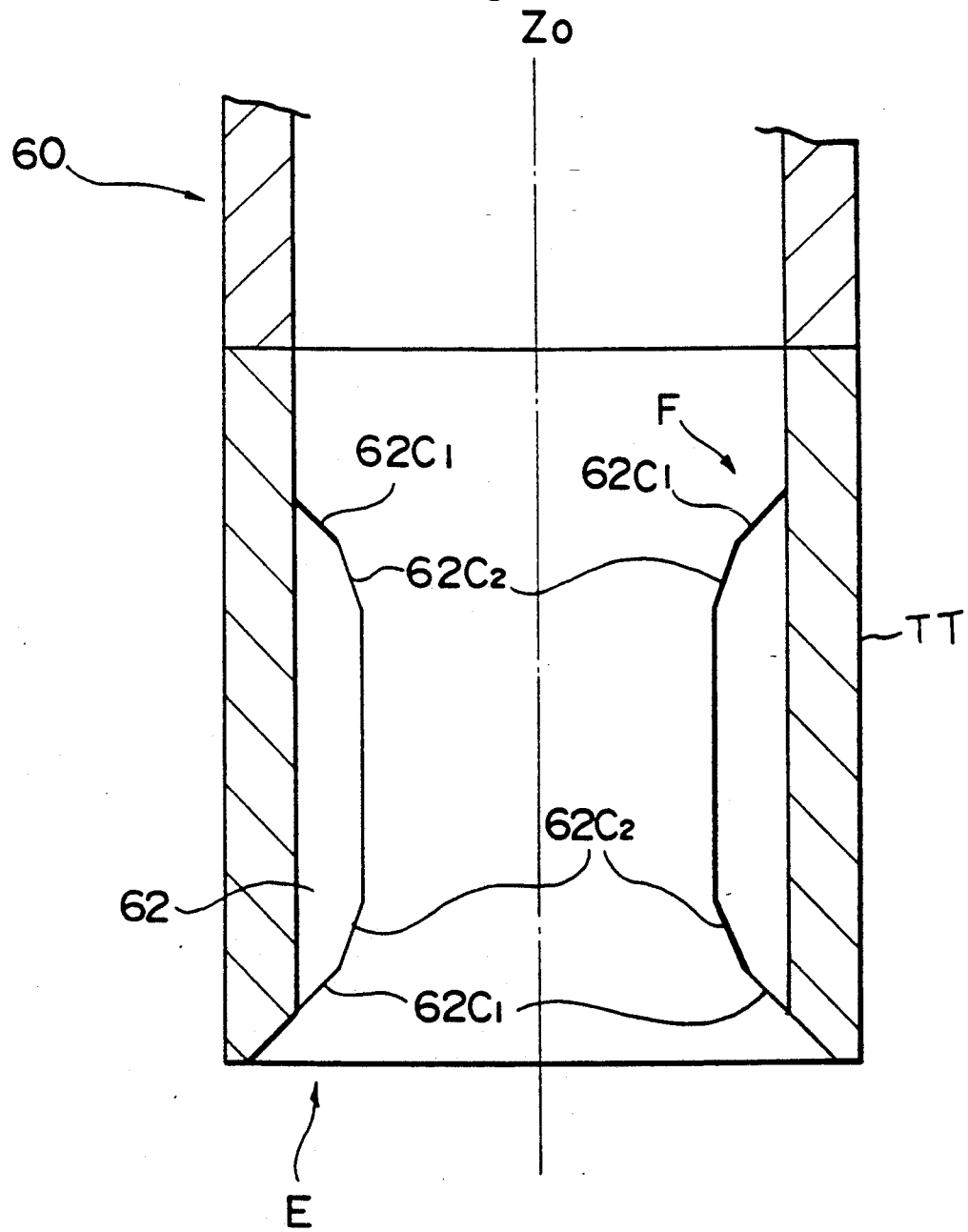

As shown in FIG. 11, two steps of chamfering may be performed to form chambered portions 62C1 and 62C2. In this arrangement, the angle of each chambered portion 62C2 can be made large enough without the need to lengthen each groove 62.

Although, in the above-described embodiment, the grooved or chamfered portions are formed at both of the open end E and top end F of the torque transmitting portion TT of the second kelly-bar 60, they may be formed at the open end E only. More specifically, the second kelly-bar 60 is applied with a bending moment due to the inclination of the inner kelly-bar 50 with respect to the second kelly-bar 60. A resistance to the bending moment at the open end E is more poor than that at the inward portion of the second kelly-bar 60. Therefore, if high surface pressure or large stress is created at or near the open end E, the apparatus will be particularly disadvantageous in terms of strength. Accordingly, to obtain satisfactory strength, the aforesaid rounded or chamfered portions preferably are formed so that the inner kelly-bar 50 and the second kelly-bar 60 may make contact with each other axially inwardly from the open end E.

Figure 12:
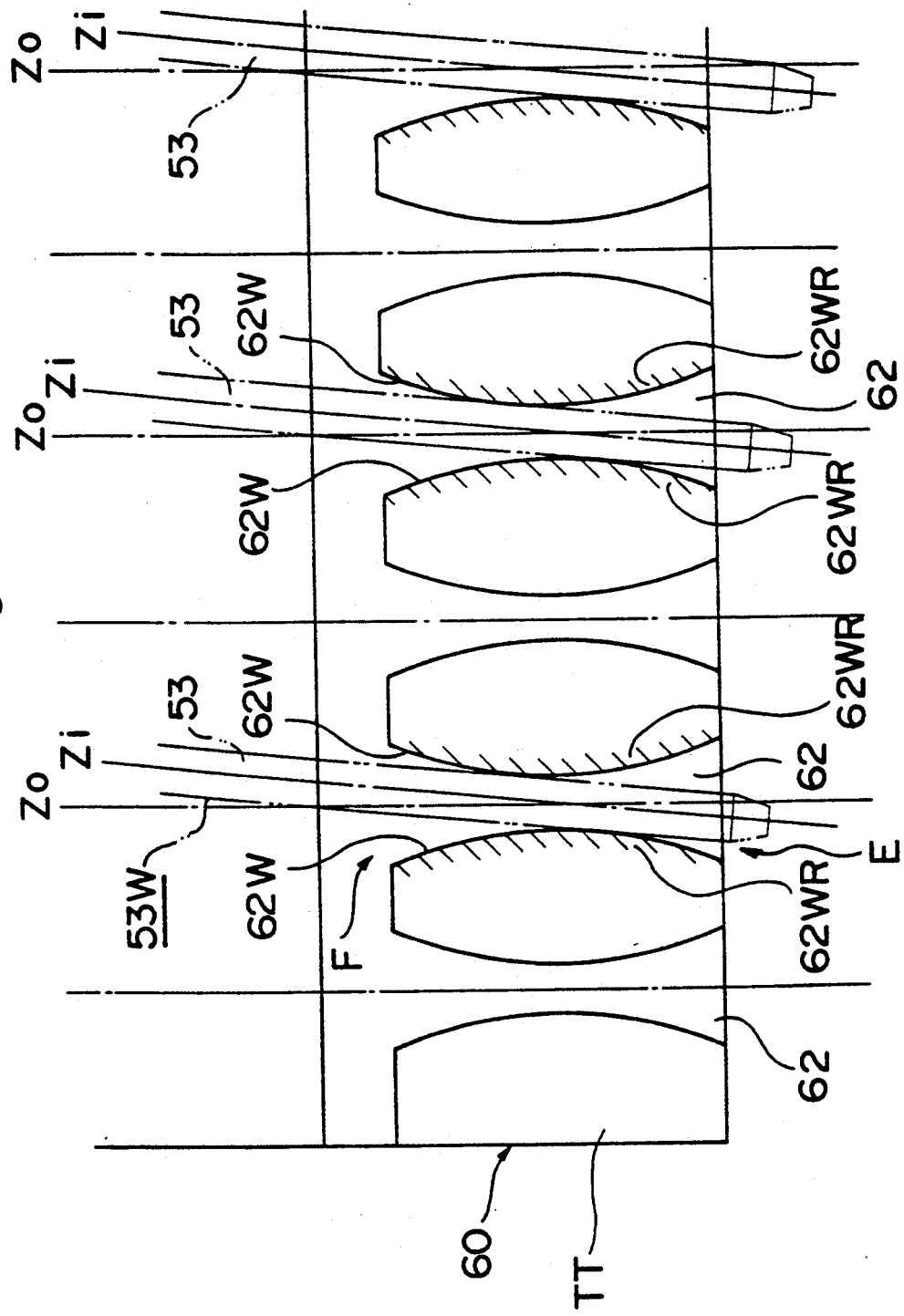
FIG. 12 is a schematic developed view showing a torque transmitting portion in which opposing faces of rectangular grooves are subjected to crowning.

FIG. 12 is a schematic developed view showing the torque transmitting portion TT provided at one end of the second kelly-bar 60. As illustrated in FIG. 12, opposite side faces 62W of each groove are subjected to so-called crowning and formed as rounded portions 62WR as shown by hatching. As is well known in the field of gear forming techniques, the crowning is the technique of swelling the central portion of an object and joining the central portion and both ends by gentle curves.

If the central axes $Z_i$ of the respective bars 53 are inclined or deflected with respect to the central axis $Z_o$ of the second kelly-bar 60 as shown in FIG. 12, each bar 61 of the inner kelly-bar 60 will come into local contact with the corresponding side faces 62W at two locations near the open end E and the top end F. As a result, high surface pressure and large stress may be created. However, by forming the rounded portions 62WR as shown in FIG. 12, the side face 53W of each bar 53 comes into contact with the side faces 62W of the corresponding groove 62 over a wide area. Accordingly, it is possible to suppress high surface pressure and high stress and also to prevent scratching from occurring during the telescopic motion of the kelly-bar apparatus.

Figure 13:
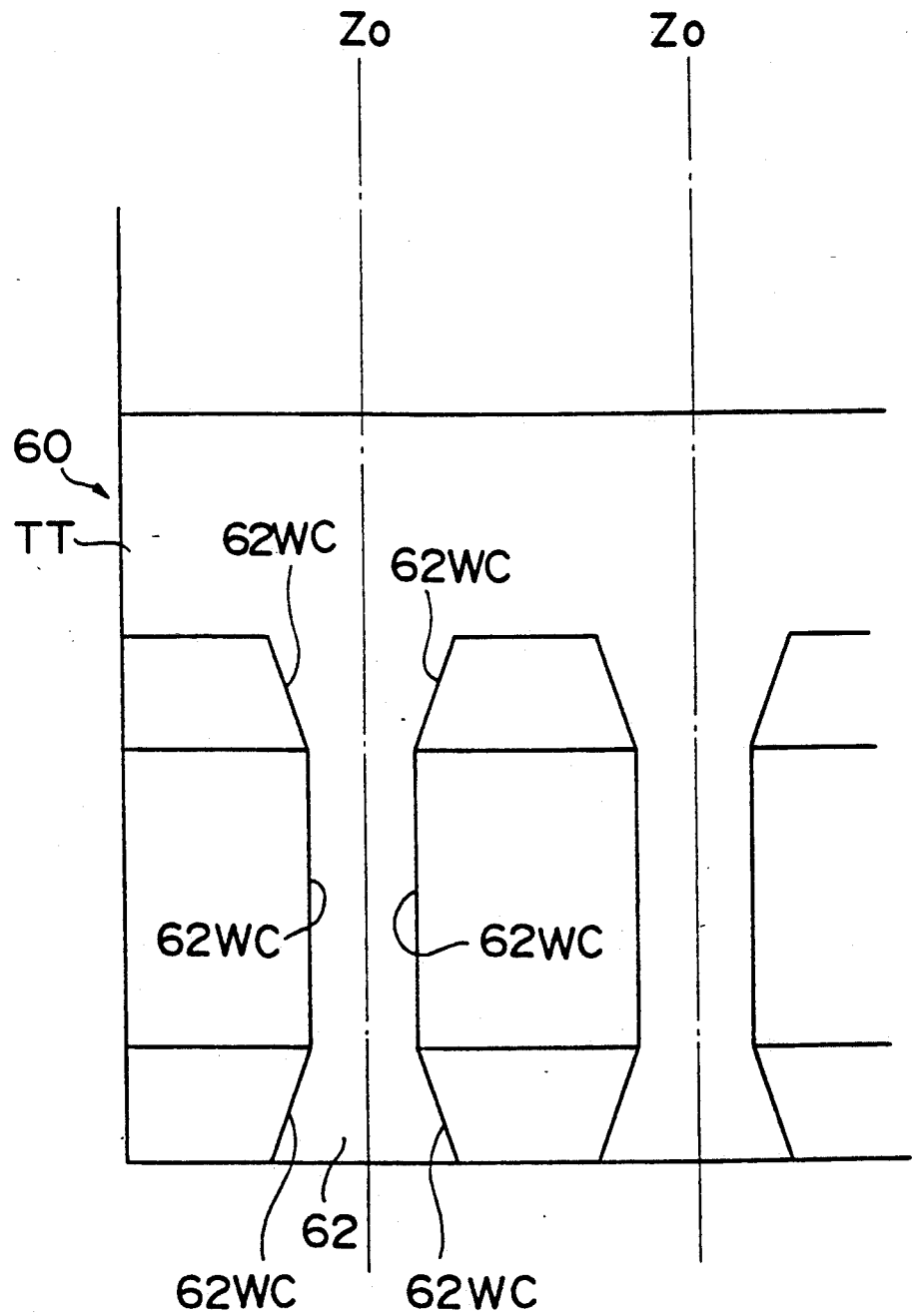
FIGS. 13 and 14 are schematic developed views showing different torque transmitting portions which utilize chamfering in place of crowning.

As shown in FIG. 13, the top and bottom ends of the side face 62W of each groove 62 may be formed into chamfered portions 62WC by chamfering. The advantages and effects of this arrangement is substantially identical to those of the above-described arrangement.

Figure 14:
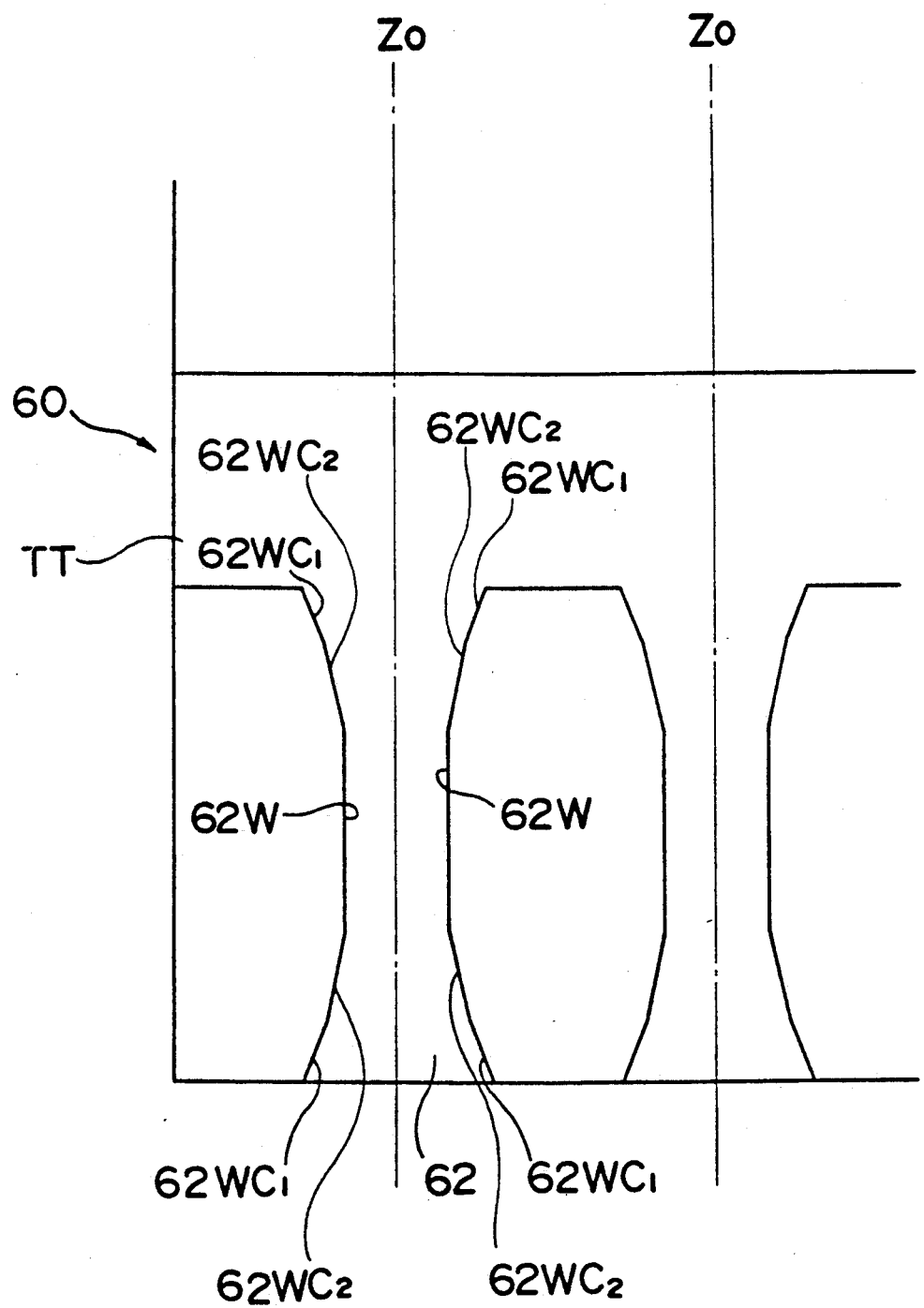

As shown in FIG. 14, two steps of chamfering may be performed to form chamfered portions 62WC1 and 62WC2.

In addition, the forming steps shown in FIGS. 8–11 and those shown in FIGS. 12–14 may be applied at the same time. It is particularly preferable to simultaneously apply the forming steps of FIG. 8 and FIG. 12.

Although the foregoing explanation refers to the inner kelly-bar 50 and the second kelly-bar 60, the second kelly-bar 60 and a third kelly-bar, the third kelly-bar and an outer kelly-bar and so on are preferably arranged in a similar manner.

Figure 15:
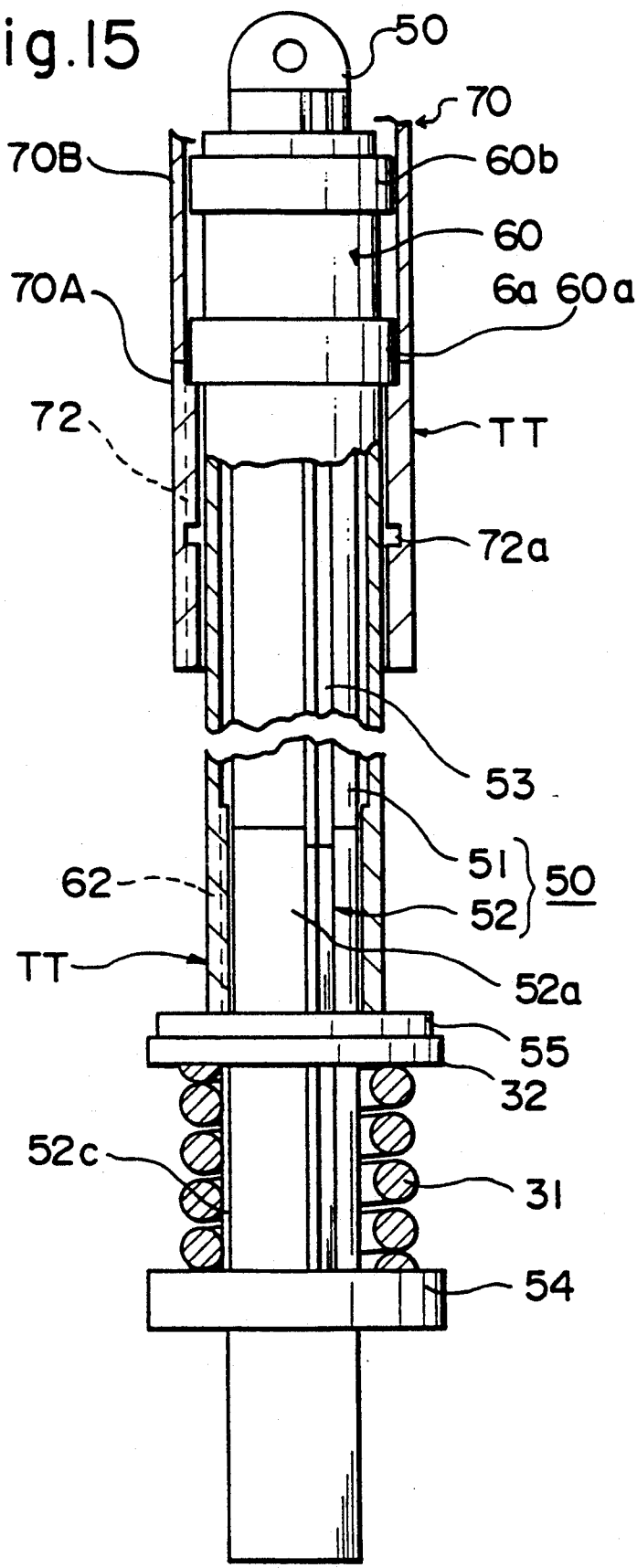
FIG. 15 is a partially sectional view showing a modification of a retaining mechanism for a second kelly-bar.

FIG. 15 is a partial cross-sectional view showing another embodiment which makes it possible to reliably engage the second kelly-bar 60 with the third kelly-bar 70 without using the stop member 74 shown in FIGS. 2 and 3.

As shown in FIG. 15, this embodiment is arranged such that the retaining member 60a of the second kelly-bar 60 is engaged with the top end face of the torque transmitting portion TT of the outer kelly bar 70. A crack-expansion preventing groove 72a is formed in the inner periphery of the torque transmitting portion TT, and circumferentially intersects the rectangular grooves 72 approximately in the middle of the inner periphery as viewed in the axial direction.

In this arrangement, if a crack should be formed in the bottom end portion of the torque transmitting portion TT and proceed upwardly, the crack is arrested at the position of the groove 72a where the wall thickness varies. Accordingly, it is possible to prevent the outer kelly-bar 70 from opening in flared form up to the top end of the torque transmitting portion TT, and the retaining member 60a reliably engages with the top end face of the stop members 74.

The position of the groove 72a is not limited to the middle of the torque transmitting portion TT. The groove 72a may be positioned at any location where it is possible to prevent cracks from proceeding upwardly of the torque transmitting portion TT.

Figure 16:
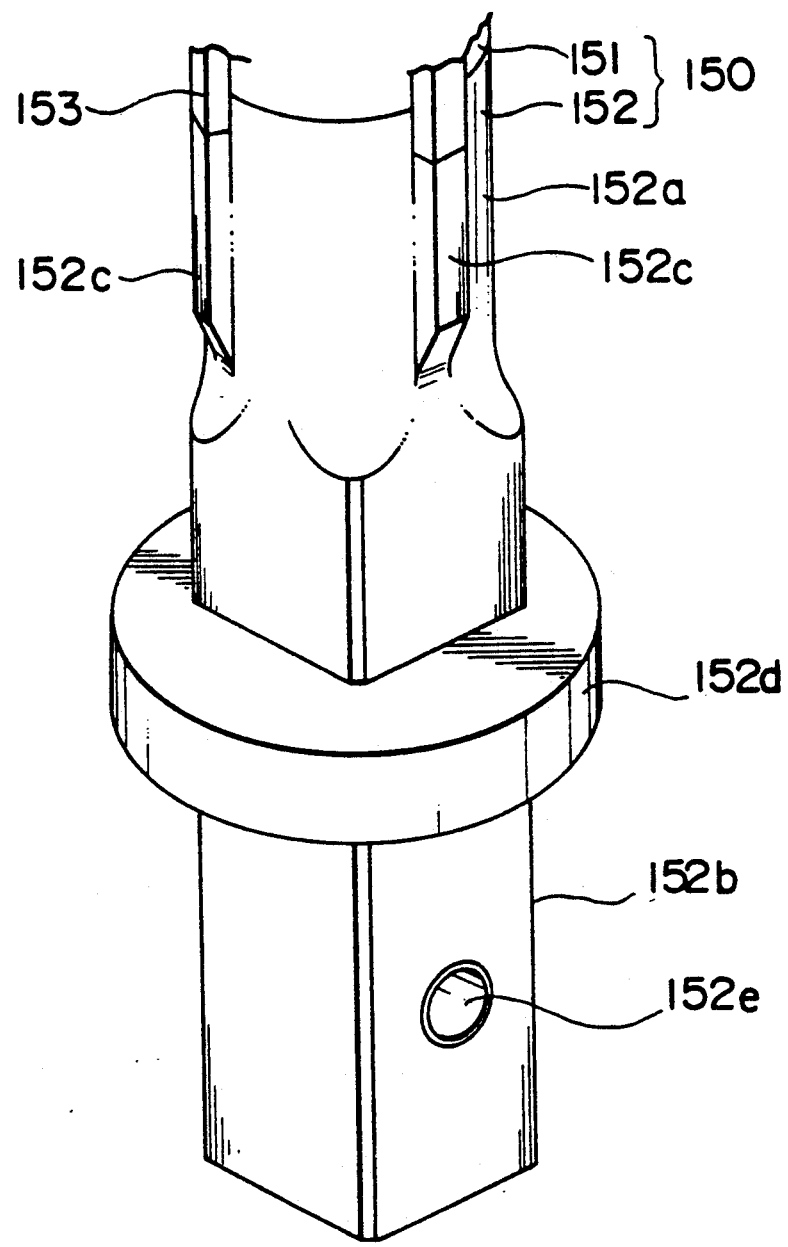
FIG. 16 is a perspective view showing an inner kelly-bar used in another embodiment.
Figure 17:
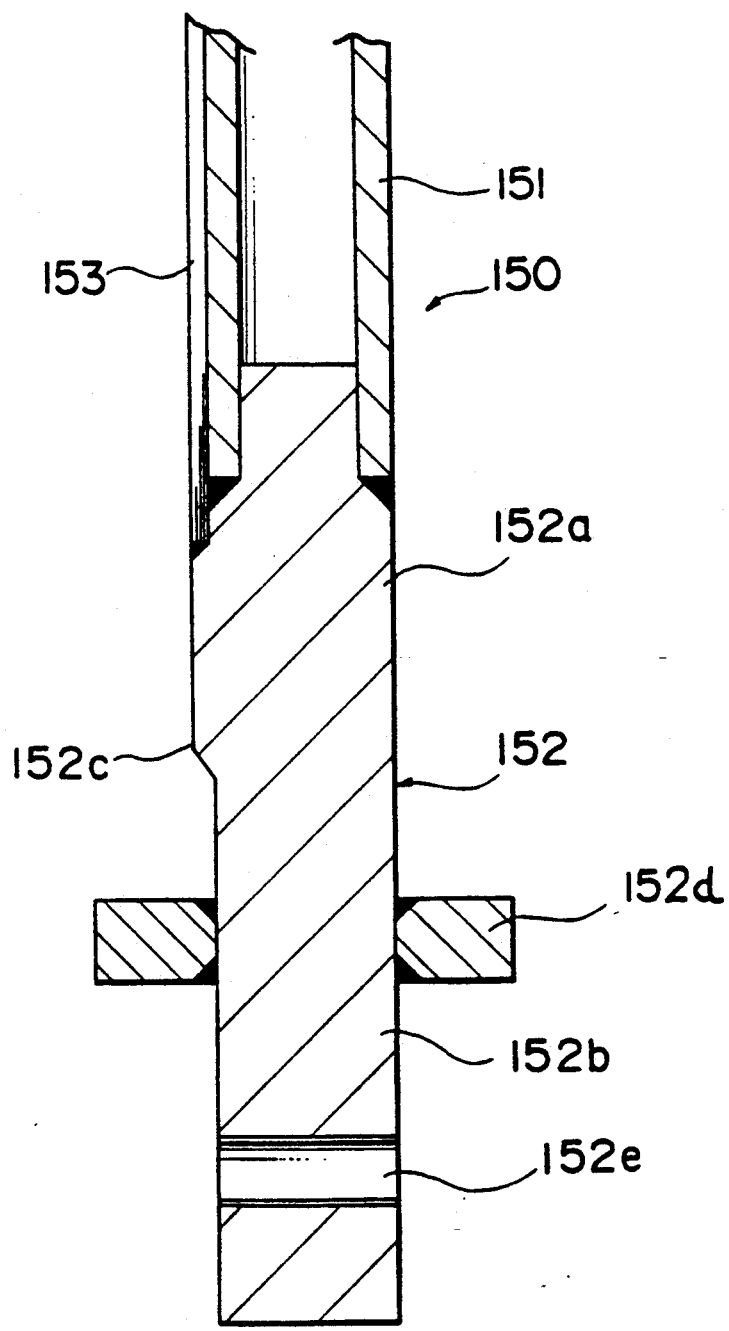
FIG. 17 is a vertical sectional view showing the inner kelly-bar shown in FIG. 16.

FIG. 16 and FIG. 17 show a modification of the inner kelly-bar shown in FIG. 5. This modification is similar to the arrangement of FIG. 5 except for the lower shaft 52.

As shown in FIGS. 16 and 17, an inner kelly-bar 150 includes an upper shaft 151 and a lower shaft 152 welded to the bottom end of the upper shaft 151. The lower shaft 152 includes a cylindrical portion 152a welded to the bottom end of the upper shaft 151, a prism-shaped portion 152b connected to the cylindrical portion 152a, and three torque transmitting bars 52c formed to be spaced apart from one another around the outer periphery of the cylindrical portion 152a. The lower shaft 152 is formed from a single prism-like material. More specifically, the cylindrical portion 152a and the bars 152c are formed by cutting the upper part of the prism-like material. A prism-shaped portion 152 has a through-bore 125e, and a spring support 152d of brim-like shape is fixed to the prism-shaped portion 152b. The bottom end of the prism-shaped portion 152b is inserted into the connecting rectangular opening of an excavating bucket (not shown).

Three torque transmitting bars 153 are welded to the upper shaft 151 in such a manner that they are spaced apart from one another around the outer periphery thereof. The bottom end of each of the bars 153 extends from the bottom end of the upper shaft 151 in the downward direction along the outer periphery of the cylindrical portion 152a. The bottom ends of the respective bars 153 are welded to the top ends of the corresponding bars 152c and the upper peripheral surface of the cylindrical portion 152a. These bars 153 and 152c are brought into engagement with the respective torque transmitting rectangular grooves 62 formed in the second kelly-bar 60 in the above-described manner.

In the above-described arrangement, the cylindrical portion 152 having a circular cross section and the prism-shaped portion 152b having a rectangular cross section are formed from a single prism-like material. Accordingly, since there is no welded part in a cross-sectionally irregular portion, stress concentration in this portion is relaxed and fatigue strength is improved. The bottom end of each of the bars 153 welded to the outer periphery of the upper shaft 151 extends from the bottom end of the upper shaft 151 in the downward direction, and is welded to the top end of the corresponding bar 152c and the upper peripheral surface of the cylindrical portion 152a. Accordingly, the strength of a portion where the upper shaft 151 is connected to the lower shaft 152 is increased and the strength of the bars 153 can also be increased.

Figure 18:
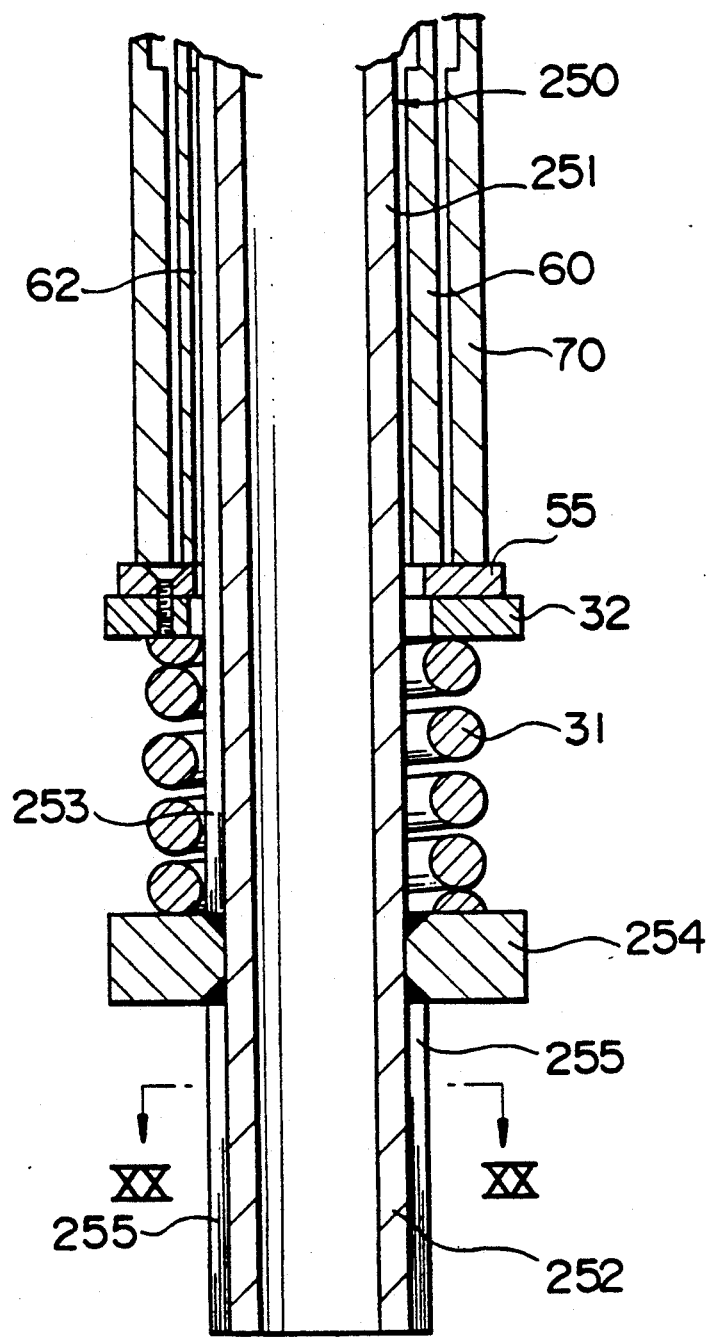
FIG. 18 is a cross-sectional view showing a kelly-bar apparatus employing an inner kelly-bar used in yet another embodiment, and shows on an enlarged scale the bottom portion of the inner kelly-bar.
Figure 19:
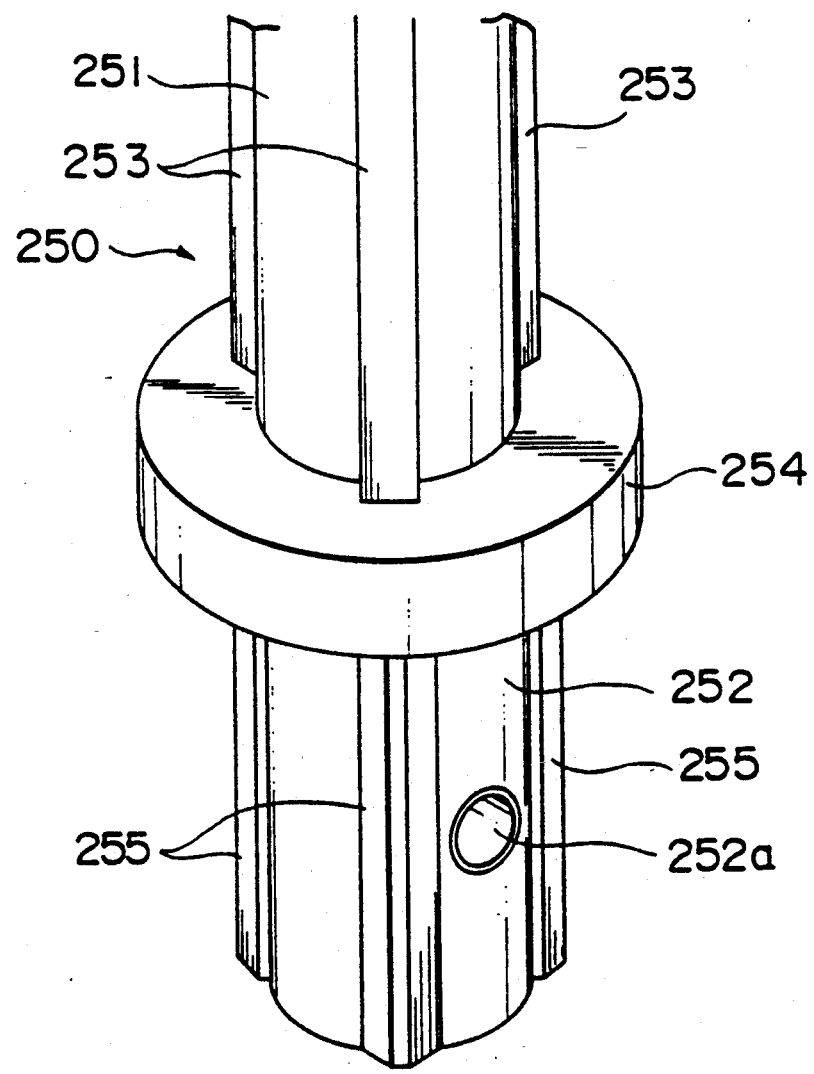
FIG. 19 is a perspective view of the inner kelly-bar of FIG. 18.
Figure 20:
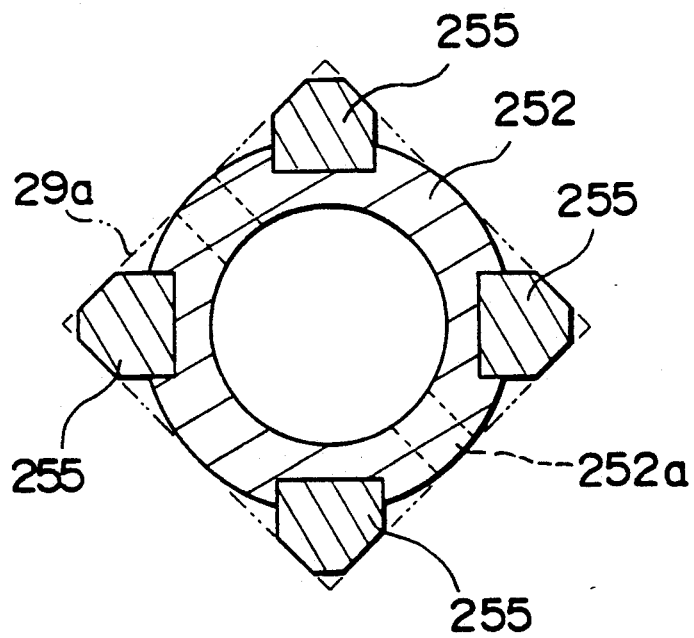
FIG. 20 is a cross-sectional view taken along line XX—XX of FIG. 18.

FIGS. 18, 19 and 20 are schematic views showing another modification of the inner kelly-bar.

An inner kelly-bar 250 has a cylindrical shape as a whole, and a brim-like spring support 254 is welded to the bottom end of the inner kelly bar 250. The part above the spring support 254 is called a body shaft 251, while the part below is called a connecting shaft 252. The connecting shaft 252 is provided with a through-bore 252a for mounting an excavating bucket (not shown). Four polygonal bars 255 are secured to the outer periphery of the connecting shaft 252 in such a manner that they are spaced apart at equal angular intervals and extend along the axis of the connecting shaft 252. The connecting shaft 252 is inserted into a connecting rectangular hole 29a (refer to FIG. 20) which is formed in the connecting portion of the excavating bucket (not shown). The connecting shaft 252 is positioned by engaging the four bars 255 with the respective corners of the connecting rectangular hole 29a. Thereafter, a pin (not shown) is inserted through the through-bore 252a to connect the connecting shaft 252 with the excavating bucket. The aforesaid bar 255 is made of a material which is lower in hardness than the connecting portion of the excavating bucket, and is replaceably engaged with recesses formed in the connecting shaft 252.

Three torque transmitting bars 253 are welded to the outer periphery of the body shaft 251, and the bottom ends of the respective bars 253 are welded to the top face of the spring support 254. As described above, the bars 253 are engaged with the respective torque transmitting rectangular grooves 62 (refer to FIG. 18) formed in the inner periphery of the second kelly-bar 60.

The rotational torque of the outer kelly-bar 70 created by a kelly driving device (not shown) is transmitted through the second kelly-bar 60 and the inner kelly-bar 250 to the excavating bucket. During rotation, since the four positioning bars 255 of the connecting shaft 252 are engaged with the respective corners of the connecting rectangular holes 29a, torque can be reliably transmitted to the excavating bucket. The excavating bucket is rotated integrally with the inner kelly-bar 250 to drill the ground.

In the above described arrangement, since the body shaft 251 and connecting shaft 252 of the inner kelly-bar 250 are formed from a single cylindrical tube, the inner kelly-bar 250 has a uniform cross section and stress concentration which has otherwise been experienced does not take place. In addition, since the bottom ends of the torque transmitting bars 253 of the body shaft 251 are welded to the spring support 254, the strength of the bars 253 can be increased.

Further, since the replaceable positioning bars 255 are formed from a material which is lower in hardness than the connecting portion of the excavating bucket, wear occurs on only the bars 255 and no wear occurs on the inner wall of the connecting rectangular hole 29a which is difficult to recover. Accordingly, if wear occurs on any of the bar 255, the worn bar is replaced by a new bar, but the recovery of the connecting rectangular hole 29a is not needed.

Figure 21:
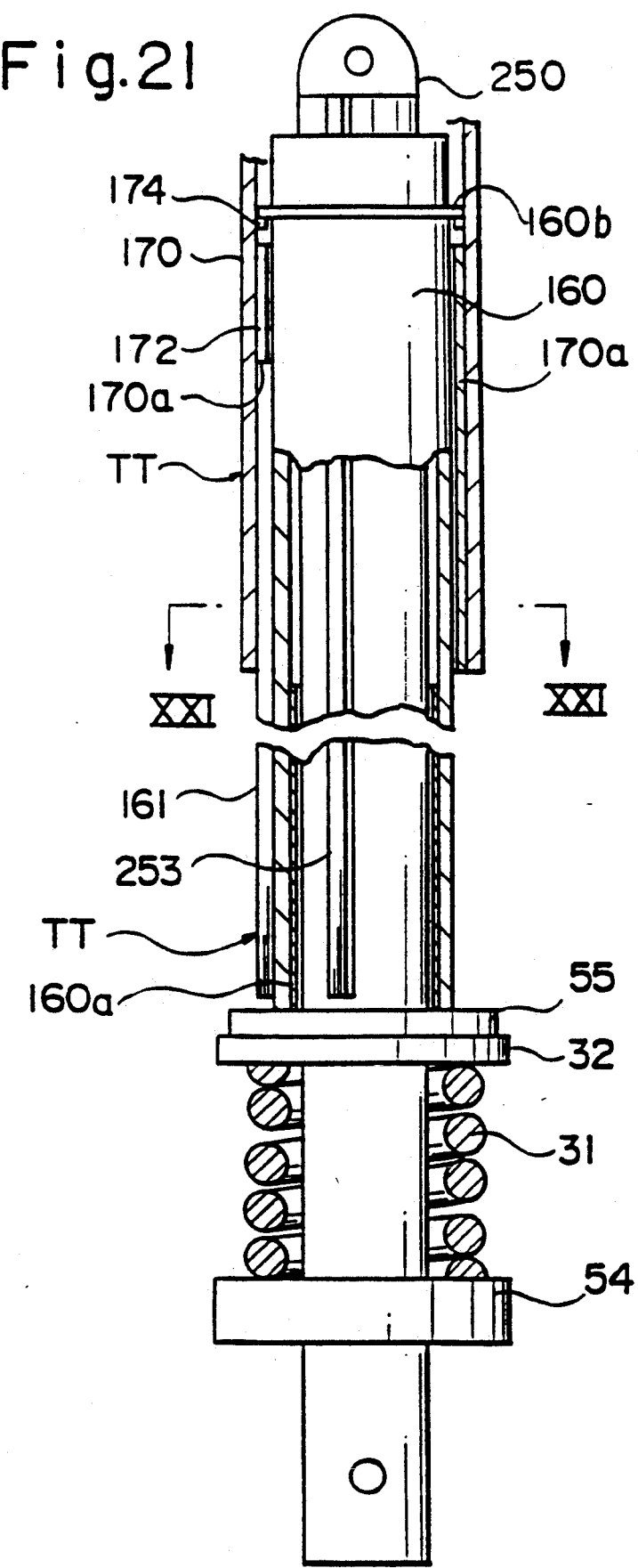
FIG. 21 is a vertical sectional view showing yet another kelly-bar apparatus.
Figure 22:
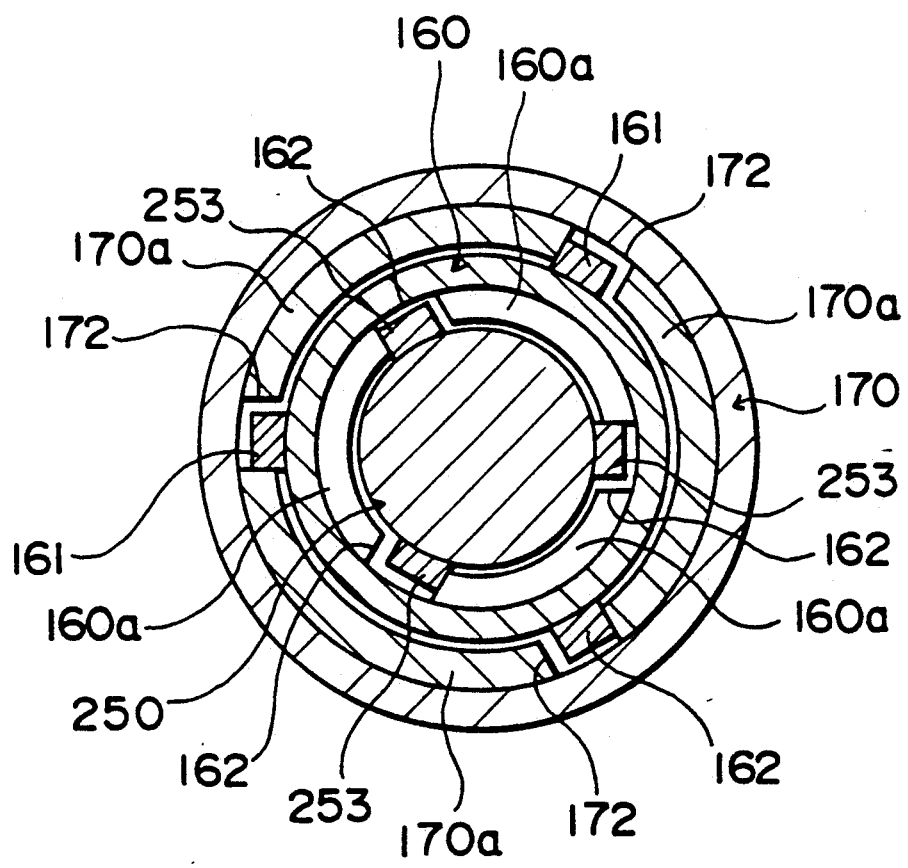
FIG. 22 is a vertical sectional view taken along line XXII—XXII of FIG. 21.
Figure 26:
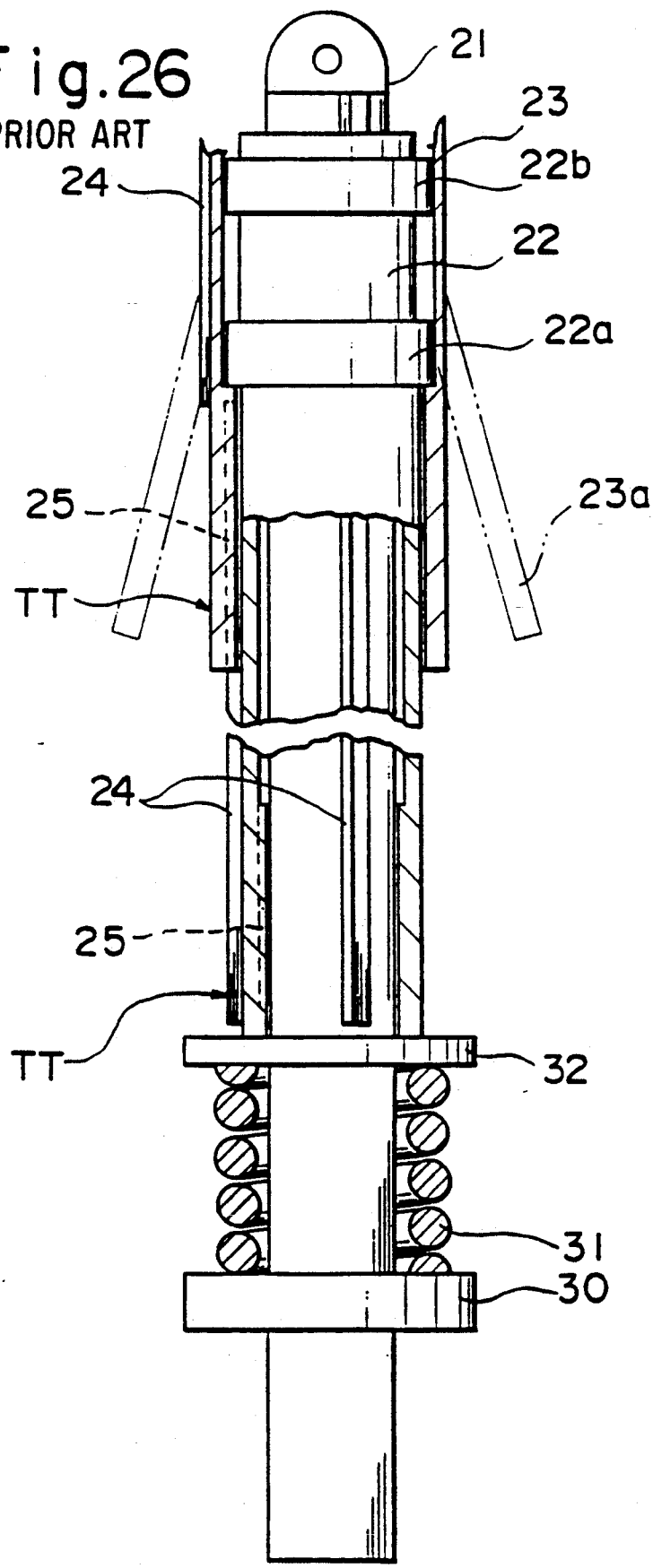
FIG. 26 is a cross sectional view showing a retaining mechanism for a second kelly-bar in the kelly-bar apparatus of FIG. 23.
Figure 27:
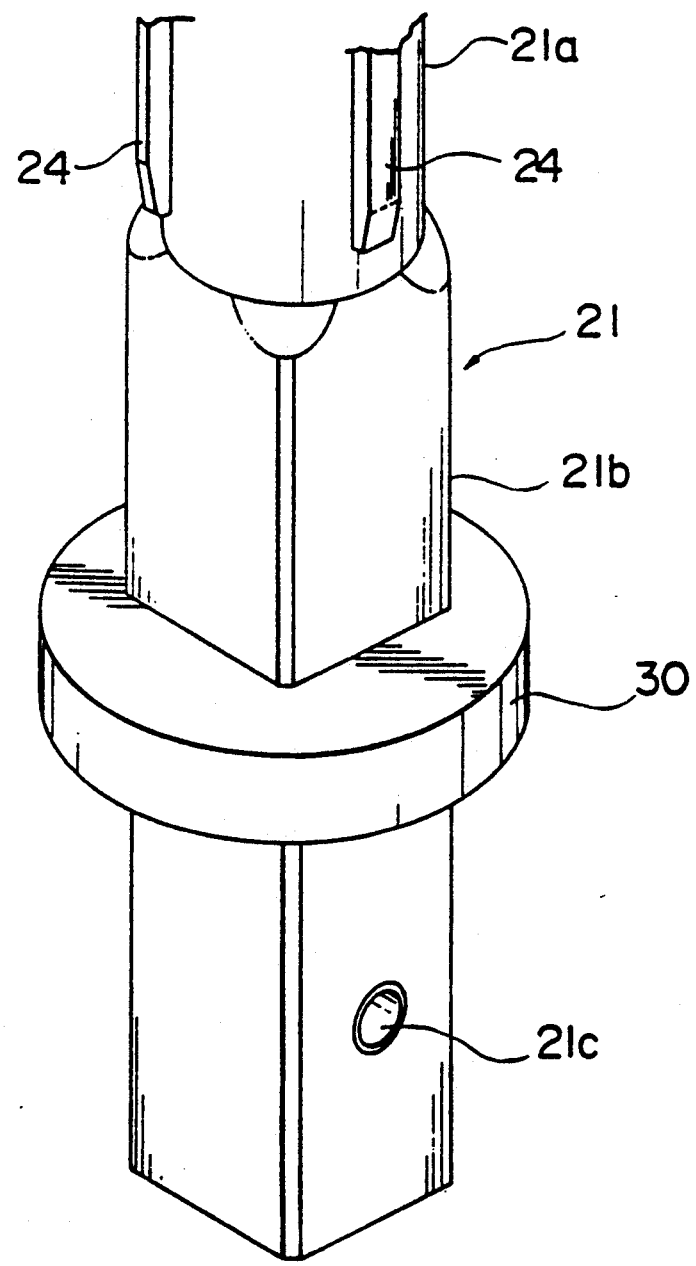
FIG. 27 is a perspective view showing the inner kelly-bar of the kelly-bar apparatus of FIG. 23.

FIGS. 21 and 22 are views showing another embodiment of a stop device for preventing the second kelly-bar from coming away from the outer kelly-bar.

A second kelly-bar 160 and an outer kelly-bar 170 are formed from a single thin-walled cylinder. Three strips 160a are fixed to the inner periphery of the bottom end portion of the second kelly-bar 160 in such a manner that they are spaced apart from one another at equal intervals. Torque transmitting recesses 162 are defined between the respective strips 160a. Three strips 170a are fixed to the inner periphery of the bottom end portion of the outer kelly-bar 170 in a similar manner, and torque transmitting recesses 172 are defined between the respective strips 170a. Torque is transmitted by engaging the bars 173 of the inner kelly-bar 250 with the respective recesses 162 and by engaging the bars 161 of the second kelly-bar 160 with the respective recesses 172. In this embodiment as well, a portion in which the strips 160a and 170a are secured is called the torque transmitting portion TT. Stop members 174 are disposed to project from the inner periphery of the outer kelly-bar 170 as shown in FIG. 19. The stop members 174 are spaced apart upwardly from the torque transmitting portion TT and are offset from the respective bars 161 of the second kelly-bar 160. A retaining member 160b for preventing the second kelly-bar 160 from coming off is disposed around the outer periphery of the top end of the second kelly-bar 160.

In the illustrated embodiment, when excavation proceeds and the second kelly-bar 160 extends from the outer kelly-bar 170 to its full length, the retaining member 160b falls on the stop members 174 to prevent the second kelly-bar 160 from coming off.

In the outer kelly-bar 170 having the torque transmitting portion of the second embodiment, a crack-expansion preventing recess may also be formed to traverse the torque transmitting grooves 172 in the circumferential direction. In this case, each strip 170a may be an axially two-split structure.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A cylindrical telescopic kelly-bar apparatus comprising:
   a first kelly-bar having a circular configuration in cross section and a torque transmitting projection;

a second kelly-bar having a circular configuration in cross section and a torque transmitting recess for engagement with said torque transmitting projection, said second kelly-bar being fitted onto said first kelly-bar in such a manner that they can be telescopically operable and that torque can be transmitted from said second kelly-bar to said first kelly-bar;

a spring support disposed on said first kelly-bar; and spring means arranged on said spring support so as to provide support for said second kelly-bar; wherein said first kelly-bar includes:

a first shaft having a circular configuration in cross section, said torque transmitting projection being provided on the outer periphery of said first shaft; and a second shaft connected to a bottom of said first shaft for connection to an excavating bucket;

said torque transmitting projection being formed to extend to the bottom portion of said first shaft, and a bottom portion of said torque transmitting projection being fitted into and welded to said spring support.

2. A cylindrical telescopic kelly-bar apparatus according to claim 1, wherein said first and second shafts are formed from a single material.

3. A cylindrical telescopic kelly-bar apparatus according to claim 1, wherein a plurality of said torque transmitting recesses axially extend and are spaced apart circumferentially at predetermined angular intervals, axially extending drainage recesses begin formed to extend between said respective torque transmission recesses, said drainage recesses each having a hemispherical configuration in cross section.

4. A cylindrical telescopic kelly-bar apparatus comprising:

a first kelly-bar having a circular configuration in cross section and a torque transmitting projection;

a second kelly-bar having a circular configuration in cross section and a torque transmitting recess for engagement with said torque transmitting projection, said second kelly-bar being fitted onto said first kelly-bar in such a manner that they can be telescopically operable and that torque can be transmitted from said second kelly-bar to said first kelly-bar;

a spring support disposed on said first kelly-bar; and spring means arranged on said spring support so as to provide support for said second kelly-bar; wherein said first kelly-bar includes:

a first shaft having a circular configuration in cross section, said torque transmitting projection being provided on the outer periphery of said first shaft;

a second shaft connected to a bottom of said first shaft for connection to an excavating bucket; and an engagement member formed on an upper portion of said second shaft to which said first shaft is connected, said engagement member supporting said spring support;

said spring support being fitted onto and welded to said first kelly-bar in such a manner that said spring support is placed on said engagement member.

5. A cylindrical telescopic kelly-bar apparatus according to claim 4, wherein said first and second shafts and said engagement member are formed from a signal material.

6. A cylindrical telescopic kelly-bar apparatus according to claim 4, wherein a plurality of said torque transmitting recesses axially extend and are spaced apart circumferentially at predetermined angular intervals, axially extending drainage recesses being formed to extend between said respective torque transmission recesses, said drainage recesses each having a hemispherical configuration in cross section.

7. A cylindrical telescopic kelly-bar apparatus comprising:

a first kelly-bar having a circular configuration in cross section and a torque transmitting projection as well as a retaining member, said torque transmitting projection being formed to extend axially on the outer periphery of said first kelly-bar, said retaining member begin provided on the top portion of the first kelly-bar; and a second kelly-bar having circular configuration in cross section and being telescopically fitted onto said first kelly-bar, said second kelly-bar having a torque transmitting member formed at the bottom portion of said second kelly-bar, a torque transmitting recess for engagement with said torque transmitting projection being formed in the inner periphery of said torque transmitting member; wherein a stop member is projected from the inner periphery of said second kelly-bar at a location spaced a predetermined distance apart and detached from the top end of said torque transmitting member in the upward direction, said retaining member being arranged to come into engagement with said stop member to inhibit said first kelly-bar from coming off.

8. A cylindrical telescopic kelly-bar apparatus according to claim 7, wherein a plurality of said torque transmitting recesses axially extend and are spaced apart circumferentially at predetermined angular intervals, axially extending drainage recesses being formed to extend between said respective torque transmission recesses, said drainage recesses each having a hemispherical configuration in cross section.

9. A cylindrical telescopic kelly-bar apparatus at least comprising:

a first kelly-bar having a torque transmitting projection on its outer periphery of circular configuration in cross section;

a second kelly-bar having a cross-sectionally circular inner periphery and removably fitted onto said first kelly-bar and provided with a torque transmitting recess for engagement with said projection, said torque transmitting recess being formed int he cross-sectionally circular inner periphery of one end portion of said second kelly-bar; and a spring support on which said one end portion of said second kelly bar rests;

said first kelly-bar and said second kelly-bar being telescopically operable with respect to each other, torque being transmittable from said second kelly-bar to said first kelly-bar; wherein either one of a rounded portion and a chamfered portion is formed around an inner edge of said one end portion of said second kelly-bar in which said torque transmitting recess is formed, so that said one of a rounded portion and a chamfered portion enlarges a contact area between said torque transmitting recess and said projection in an axial direction of sad kelly-bars, and a flat contact area formed on a bottom surface of said one end of said second kelly-bar, said flat contact area being in contact with said spring support.

10. A cylindrical telescopic kelly-bar apparatus according to claim 9, wherein a plurality of said torque transmitting recesses axially extend and are spaced apart circumferentially at predetermined angular intervals, axially extending drainage recesses being formed to extend between said respective torque transmission recesses, said drainage recesses each having a hemispherical configuration in cross section.

11. A cylindrical telescopic kelly-bar apparatus at least comprising:

a first kelly-bar having a torque transmitting projection on its outer periphery of circular configuration in cross section; and a second kelly-bar removably fitted onto said first kelly-bar and provided with a torque transmitting recess for engagement with said projection, said torque transmitting recess being formed in a cross-sectionally circular inner periphery of one end portion of said second kelly-bar;

said first kelly-bar and said second kelly-bar being telescopically operable with respect to each other, torque being transmittable from said second kelly-bar to said first kelly-bar; wherein either one of a rounded portion and a chamfered portion is formed on at least one end of a side face of said torque transmitting recess, said projection being contacted with said side face of said torque transmitting recess during torque transmission.

12. A cylindrical telescopic kelly-bar apparatus according to claim 11, wherein a plurality of said torque transmitting recesses axially extend and are spaced apart circumferentially at predetermined angular intervals, axially extending drainage recesses being formed to extend between said respective torque transmission recesses, said drainage recesses each having a hemispherical configuration in cross section.

13. A cylindrical telescopic kelly-bar apparatus comprising:

a first kelly-bar having a circular configuration in cross section and a torque transmitting projection; and a second kelly-bar having a circular configuration in cross section and a torque transmitting recess for engagement with said projection, said second kelly-bar being fitted onto said first kelly-bar in such a manner that they can be telescopically operable and that torque can be transmitted from said second kelly-bar to said first kelly-bar; wherein said first kelly-bar includes:

a cylindrical or round-bar-shaped upper shaft which is provided with an upper torque transmitting projection around its outer periphery;

a lower shaft formed from a single member and welded to the bottom of said upper shaft, an excavating bucket being connected to the bottom end of said lower shaft; and a lower torque transmitting projection formed integrally with the upper portion of the outer periphery of said lower shaft by cutting, said lower torque transmitting projection being connected to said upper torque transmitting projections by welding.

14. A cylindrical telescopic kelly-bar apparatus according to claim 13, wherein said upper torque transmitting projection extends downwardly from the bottom end of said upper shaft along the outer periphery of said lower shaft, the extending end of said upper torque transmitting projection being welded to said lower shaft.

15. A cylindrical telescopic kelly-bar apparatus according to claim 14, wherein a plurality of said torque transmitting recesses axially extend and are spaced apart circumferentially at predetermined angular intervals, axially extending drainage recesses being formed to extend between said respective torque transmission recesses, said drainage recesses each having a hemispherical configuration in cross section.

16. A cylindrical telescopic kelly-bar apparatus according to claim 13, wherein a plurality of said torque transmitting recesses axially extend and are spaced apart circumferentially at predetermined angular intervals, axially extending drainage recesses being formed to extend between said respective torque transmission recesses, said drainage recesses each having a hemispherical configuration in cross section.

* * * * *